US010708812B2

(12) United States Patent
Basu Mallick et al.

(10) Patent No.: US 10,708,812 B2
(45) Date of Patent: Jul. 7, 2020

(54) RELAY UE DISCOVERY FOR PROXIMITY SERVICES

(71) Applicant: Panasonic Intellectual Property Corporation of America, Torrance, CA (US)

(72) Inventors: Prateek Basu Mallick, Hessen (DE); Joachim Loehr, Hessen (DE); Takako Hori, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 242 days.

(21) Appl. No.: 15/746,370

(22) PCT Filed: Jul. 24, 2015

(86) PCT No.: PCT/CN2015/085053
§ 371 (c)(1),
(2) Date: Jan. 19, 2018

(87) PCT Pub. No.: WO2017/015788
PCT Pub. Date: Feb. 2, 2017

(65) Prior Publication Data
US 2019/0387429 A1    Dec. 19, 2019

(51) Int. Cl.
*H04W 28/02* (2009.01)
*H04W 36/00* (2009.01)
(Continued)

(52) U.S. Cl.
CPC ....... *H04W 28/0284* (2013.01); *H04W 8/005* (2013.01); *H04W 28/0289* (2013.01);
(Continued)

(58) Field of Classification Search
CPC . H04W 28/0284; H04W 8/005; H04W 40/24; H04W 36/03; H04W 40/04
See application file for complete search history.

(56) References Cited

U.S. PATENT DOCUMENTS

| 2005/0232146 | A1* | 10/2005 | Lee | ......................... | H04L 45/22 |
| | | | | | 370/225 |
| 2009/0163223 | A1* | 6/2009 | Casey | ................... | H04W 36/22 |
| | | | | | 455/453 |

(Continued)

FOREIGN PATENT DOCUMENTS

| CN | 102625366 A | 8/2012 |
| JP | 2014-505421 A | 2/2014 |

(Continued)

OTHER PUBLICATIONS

International Search Report, dated Apr. 15, 2016, for corresponding International Patent Application PCT/CN2015/085053, 2 pages.
(Continued)

*Primary Examiner* — Andrew Lai
*Assistant Examiner* — Sumitra Ganguly
(74) *Attorney, Agent, or Firm* — Seed IP Law Group LLP

(57) ABSTRACT

The invention relates to a method for discovery of one or more relay user equipments within a mobile communication network. A relay user equipment is capable to perform direct communication over a direct sidelink connection respectively with one or more remote user equipments, and is further capable to serve as a relay respectively for the one or more remote user equipments to relay communication between the one or more remote user equipments and the radio base station. The relay user equipment determines whether an overload situation exists in the relay user equipment or not, the overload situation preventing the relay user equipment to serve as a relay for a further remote user equipment. The relay user equipment transmits a relay
(Continued)

discovery message, at least comprising an overload indication providing information on the result of the determination as to whether the overload situation exists in the relay user equipment.

18 Claims, 12 Drawing Sheets

(51) Int. Cl.
*H04W 8/00* (2009.01)
*H04W 40/04* (2009.01)
*H04W 40/24* (2009.01)

(52) U.S. Cl.
CPC .......... *H04W 36/03* (2018.08); *H04W 40/04* (2013.01); *H04W 40/24* (2013.01)

(56) References Cited

U.S. PATENT DOCUMENTS

| | | |
|---|---|---|
| 2010/0238826 A1 | 9/2010 | Borran et al. |
| 2012/0218886 A1 | 8/2012 | Van Phan et al. |
| 2013/0028086 A1* | 1/2013 | Wu .................... H04W 28/08 370/235 |
| 2013/0286828 A1 | 10/2013 | Cho et al. |
| 2013/0286965 A1* | 10/2013 | Xu ..................... H04L 5/0035 370/329 |
| 2014/0119186 A1* | 5/2014 | Wong ............... H04W 28/0289 370/235 |
| 2015/0029866 A1* | 1/2015 | Liao .................... H04W 4/023 370/241 |
| 2016/0198516 A1 | 7/2016 | Kim et al. |
| 2016/0269185 A1* | 9/2016 | Stojanovski ......... H04L 9/3247 |
| 2016/0286459 A1 | 9/2016 | Enomoto et al. |

FOREIGN PATENT DOCUMENTS

| | | | | |
|---|---|---|---|---|
| WO | 2008/119948 A1 | 10/2008 | | |
| WO | 2014/179722 A1 | 11/2014 | | |
| WO | WO-2014179722 A1 * | 11/2014 | ............ | H04W 48/20 |
| WO | 2015/005626 A1 | 1/2015 | | |
| WO | 2015/068731 A1 | 5/2015 | | |

OTHER PUBLICATIONS

3GPP TS 22.179 V13.2.0, "3rd Generation Partnership Project; Technical Specification Group Services and System Aspects; Mission Critical Push to Talk (MCPTT) over LTE; Stage 1 (Release 13)", Jun. 2016, 77 pages.
3GPP TS 36.331 V12.6.0, "3rd Generation Partnership Project; Technical Specification Group Radio Access Network; Evolved Universal Terrestrial Radio Access (E-UTRA); Radio Resource Control (RCC); Protocol specification (Release 12)", Jun. 2015, 449 pages.
3GPP TS 23.221 V13.0.0, "3rd Generation Partnership Project; Technical Specification Group Services and System Aspects; Architectural requirements (Release 13)", Jun. 2014, 52 pages.
3GPP TS 23.003 V13.2.0, "3rd Generation Partnership Project; Technical Specification Group Core Network and Terminals; Numbering, addressing and identification (Release 13)", Jun. 2015, 93 pages.
3GPP TS 23.401 V13.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Jun. 2015, 324 pages.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015, 94 pages.
3GPP TS 23.303 V13.0.0, "3rd Generation Partnership Project; Technical Specification Group Services and System Aspects; Proximity-based services (ProSe); Stage 2 (Release 13)", Jun. 2015, 97 pages.
3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Mar. 2016, 295 pages.
3GPP TR 23.713 V1.4.0, "3rd Generation Partnership Project; Technical Specification Group Services and System Aspects; Study on extended architecture support for proximity-based services (Release 13)", Jun. 2015, 85 pages.
3GPP TR 36.843 V12.0.1, "3rd Generation Partnership Project; Technical Specification Group Radio Access Network; Study on LTE Device to Device Proximity Services; Radio Aspects (Release 12)", Mar. 2014, 50 pages.
3GPP TS 36.211 V12.6.0, "3rd Generation Partnership Project; Technical Specification Group Radio Access Network; Evolved Universal Terrestrial Radio Access (E-UTRA); Physical channels and modulation (Release 12)", Jun. 2015, 136 pages.
CATT, "Considerations about ProSe UE-UE Relays," Agenda Item 7.13, S2-142853, *SA WG2 Meeting #104*, Dublin, Ireland, Jul. 7-11, 2014, 3 pages.
Extended European Search Report, dated Dec. 20, 2018, for European Application No. 15899140.6-1214 / 3326429, 14 pages.
ITRI, "Discussion on UE-to-Network Relay Synchronization, Discovery and Selection," Agenda Item 7.5.1.1, R2-152196, *3GPP TSG-RAN2#90*, Fukuoka, Japan, May 25-29, 2015, 5 pages.
Notice of Reasons for Rejection, dated Feb. 12, 2019, for corresponding Japanese Application No. 2017-567432, 10 pages (With English Translation).

\* cited by examiner

RELAY UE DISCOVERY FOR PROXIMITY SERVICES

BACKGROUND

Technical Field

The present disclosure relates to methods for discovery of relay user equipments within a mobile communication network. The present disclosure is also providing the relay user equipment and corresponding remote user equipment for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}$=110 are respectively the smallest and the largest downlink bandwidths, supported by the current version of the specification. $N_{sc}^{RB}$ is the number of subcarriers within one resource block. For normal cyclic prefix subframe structure, $N_{sc}^{RB}$=12 and $N_{symb}^{DL}$=7.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 12.6.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:

1. For each SCell the usage of uplink resources by the UE in addition to the downlink ones is configurable (the number of DL SCCs configured is therefore always larger or equal to the number of UL SCCs, and no SCell can be configured for usage of uplink resources only)

2. The downlink PCell cannot be de-activated, unlike SCells

3. Re-establishment is triggered when the downlink PCell experiences Rayleigh fading (RLF), not when downlink SCells experience RLF 4. Non-access stratum information is taken from the downlink PCell 5. PCell can only be changed with handover procedure (i.e., with security key change and RACH procedure)

6. PCell is used for transmission of PUCCH

7. The uplink PCell is used for transmission of Layer 1 uplink control information 8. From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the invention the terms "D2D", "ProSe" and "sidelink" are interchangeable.

D2D Communication in LTE

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface and will be described in more detail later.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performances by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

With respect to the user plane protocols, part of the agreement from D2D communication perspective is given in the following (see also 3GPP TR 36.843 current version 12.0.1 section 9.2.2, incorporated herein by reference):

PDCP:
    1:M D2D broadcast communication data (i.e., IP packets) should be handled as the normal user-plane data.
    Header-compression/decompression in PDCP is applicable for 1:M D2D broadcast communication.
        U-Mode is used for header compression in PDCP for D2D broadcast operation for public safety;

RLC:
    RLC UM is used for 1:M D2D broadcast communication.
    Segmentation and Re-assembly is supported on L2 by RLC UM.
    A receiving UE needs to maintain at least one RLC UM entity per transmitting peer UE.
    An RLC UM receiver entity does not need to be configured prior to reception of the first RLC UM data unit.

So far no need has been identified for RLC AM or RLC TM for D2D communication for user plane data transmission.

MAC:
- No HARQ feedback is assumed for 1:M D2D broadcast communication
- The receiving UE needs to know a source ID in order to identify the receiver RLC UM entity.
- The MAC header comprises a L2 target ID which allows filtering out packets at MAC layer.
- The L2 target ID may be a broadcast, group cast or unicast address.
  - L2 Groupcast/Unicast: A L2 target ID carried in the MAC header would allow discarding a received RLC UM PDU even before delivering it to the RLC receiver entity.
  - L2 Broadcast: A receiving UE would process all received RLC PDUs from all transmitters and aim to re-assemble and deliver IP packets to upper layers.
- MAC sub header contains LCIDs (to differentiate multiple logical channels).
- At least Multiplexing/de-multiplexing, priority handling and padding are useful for D2D.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v1.4.0 section 7.1.2 incorporated herein by reference:
- Establishment of a secure layer-2 link over PC5.
- IP address/prefix assignment.
- Layer-2 link maintenance over PC5.
- Layer-2 link release over PC5.

FIG. 3 discloses how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

At least the following standard IETF mechanisms can be used for IP address/prefix assignment:
- DHCP-based IP address configuration for assignment of an IPv4 address.
- IPv6 Stateless Address auto configuration specified in RFC 4862 for assignment of an IPv6 prefix.

One of the two UEs acts as a DHCP server or an IPv6 default router. In the ProSe UE-NW Relay case (also see later chapter on ProSe relay), the relay acts as DHCP server or IPv6 default router for all Remote UEs that connect to it over a secure layer-2 link over PC5.

UEs engaging in isolated (non-relay) one-to-one communication may also use link-local addresses.

The PC5 Signaling Protocol shall support keep-alive functionality that is used to detect when the UEs are not in ProSe Communication range, so that they can proceed with implicit layer-2 link release.

The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.3.0, defines in sub-clause 8.3 the following identities to use for ProSe Direct Communication:
- SL-RNTI: Unique identification used for ProSe Direct Communication Scheduling;
- Source Layer-2 ID: Identifies the sender of the data in sidelink ProSe Direct Communication. The Source Layer-2 ID is 24 bits long and is used together with ProSe Layer-2 Destination ID and LCID for identification of the RLC UM entity and PDCP entity in the receiver;
- Destination Layer-2 ID: Identifies the target of the data in sidelink ProSe Direct Communication. The Destination Layer-2 ID is 24 bits long and is split in the MAC layer into two bit strings:
  - One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer.
  - Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, a UE shall always use the first resource pool defined in the list, even if it was configured with multiple resource pools.

As an alternative, another resource pool can be defined by the eNB and signaled in SIB18, namely by using the field commTxPoolExceptional, which can be used by the UEs in exceptional cases.

What resource allocation mode a UE is going to use is configurable by the eNB. Furthermore, what resource allocation mode a UE is going to use for D2D data communication may also depend on the RRC state, i.e., RRC_IDLE or RRC_CONNECTED, and the coverage state of the UE, i.e., in-coverage, out-of-coverage. A UE is considered in-coverage if it has a serving cell (i.e., the UE is RRC_CONNECTED or is camping on a cell in RRC_IDLE).

FIG. 4 illustrates the use of transmission/reception resources for overlay (LTE) and underlay (D2D) system.

Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 4 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 4 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done e.g., with the exchange of the D2D communication Interest Indication by the UE and the corresponding response, D2D Communication Response, where the corresponding exemplary ProseCommConfig information element mentioned above would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;

Step 2: eNB grants UL resource (for UE to send BSR) via PDCCH, scrambled by C-RNTI;

Step 3: UE sends D2D BSR indicating the buffer status via PUSCH;

Step 4: eNB grants D2D resource (for UE to send data) via PDCCH, scrambled by D2D-RNTI.

Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 12.4.0, subclause 5.4.3, incorporated herein by reference, defining in particular the SCI format 0.

On the other hand, for Mode 2 resource allocation, above steps 1-4 are basically not necessary, and the UE autonomously selects resources for the SA and D2D data transmission from the transmission resource pool(s) configured and provided by the eNB.

FIG. 5 exemplarily illustrates the transmission of the Scheduling Assignment and the D2D data for two UEs, UE-A and UE-B, where the resources for sending the scheduling assignments are periodic, and the resources used for the D2D data transmission are indicated by the corresponding Scheduling Assignment.

ProSe Network Architecture and ProSe Entities

FIG. 6 illustrates a high-level exemplary architecture for a non-roaming case, including different ProSe applications in the respective UEs A and B, as well as a ProSe Application Server and ProSe function in the network. The example architecture of FIG. 6 is taken from TS 23.303 v.13.0.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling, etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

UE Coverage states for D2D

As already mentioned before, the resource allocation method for D2D communication depends apart from the RRC state, i.e., RRC_IDLE and RRC_CONNECTED, also on the coverage state of the UE, i.e., in-coverage, out-of-coverage. A UE is considered in-coverage if it has a serving cell (i.e., the UE is RRC_CONNECTED or is camping on a cell in RRC_IDLE).

The two coverage states mentioned so far, i.e., in-coverage (IC) and out-of-coverage (OOC), are further distinguished into sub-states for D2D. FIG. 7 shows the four different states a D2D UE can be associated to, which can be summarized as follows:

State 1: UE1 has uplink and downlink coverage. In this state the network controls each D2D communication session. Furthermore, the network configures whether UE1 should use resource allocation Mode 1 or Mode 2.

State 2: UE2 has downlink but no uplink coverage, i.e., only DL coverage. The network broadcasts a (contention-based) resource pool. In this state the transmitting UE selects the resources used for SA and data from a resource pool configured by the network; resource allocation is only possible according to Mode 2 for D2D communication in such a state.

State 3: Since UE3 has no uplink and downlink coverage, the UE3 is, strictly speaking, already considered as out-of-coverage (OOC). However, UE3 is in the coverage of some UEs which are themselves (e.g., UE1) in the coverage of the cell, i.e., those UEs can be also referred as CP-relay UEs or simply relay UEs (see also later chapters on ProSe relay). Therefore, the area of the state-3 UEs in FIG. 7 can be denoted as CP UE-relay coverage area. UEs in this state 3 are also referred to as OOC-state-3 UEs. In this state the UEs receive some cell specific information which is sent by the eNB (SIB) and forwarded by the CP UE-relay UEs in the coverage of the cell via PD2DSCH to the OOC-state-3 UEs. A (contention-based) network-controlled resource pool is signaled by PD2DSCH.

State 4: UE4 is out of coverage and does not receive PD2DSCH from other UEs which are in the coverage of a cell. In this state, which is also referred to as state-4 OOC, the transmitting UE selects the resources used for the data transmission from a pre-configured pool of resources.

The reason to distinguish between state-3 OOC and state-4 OOC is mainly to avoid potentially strong interference between D2D transmissions from out-of coverage devices and legacy E-UTRA transmissions. In general, D2D-capable UEs will have preconfigured resource pool(s) for transmission of D2D SAs and data for use while out of coverage. If these out-of-coverage UEs transmit on these preconfigured resource pools near cell boundaries, then, interference between the D2D transmissions and in-coverage legacy transmissions could have a negative impact on communications within the cell. If D2D-enabled UEs within coverage forwarded the D2D resource pool configuration to those out-of-coverage devices near the cell boundary, then, the out-of-coverage UEs could restrict their transmissions to the resources specified by the eNode B and therefore minimize interference with legacy transmissions in coverage. Thus, RAN1 introduced a mechanism where in-coverage UEs are forwarding resource pool information and other D2D related configurations to those devices just outside the coverage area (state-3 UEs).

The Physical D2D synchronization channel (PD2DSCH) is used to carry this information about in-coverage D2D resource pools to the UEs in network proximity, so that resource pools within network proximity are aligned.

D2D Discovery

ProSe Direct Discovery is defined as the procedure used by the ProSe-enabled UE to discover other ProSe-enabled UE(s) in its proximity using E-UTRA direct radio signals via PC5. FIG. 8 schematically illustrates the PC5 interface for device-to-device direct discovery.

Upper layer handles authorization for announcement and monitoring of discovery information. For this purpose, UEs have to exchange predefined signals, referred to as "discovery signals". By checking discovery signals periodically, a UE maintains a list of proximity UEs in order to establish a communication link when needed. Discovery signals should be detected reliably, even in low Signal-to-Noise Ratio (SNR) environments. To allow discovery signals to be transmitted periodically, resources for Discovery signals should be assigned. There are two types of ProSe Direct Discovery: open and restricted.

Open is the case where there is no explicit permission that is needed from the UE being discovered, whereas restricted discovery only takes place with explicit permission from the UE that is being discovered.

ProSe Direct Discovery can be a standalone service enabler that could for example use information from the discovered UE for certain applications in the UE that are permitted to use this information e.g., "find a taxi nearby", "find me a coffee shop". Additionally depending on the information obtained, ProSe Direct Discovery can be used for subsequent actions e.g., to initiate ProSe Direct Communication.

ProSe Direct Discovery Models

The following models for ProSe Direct Discovery are defined in the standard 3GPP TS 23.303, current version 13.0.0, section 5.3 and all subsections thereof, incorporated herein by reference.

Model A ("I am here"):

This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

In this model the announcing UE broadcasts discovery messages at pre-defined discovery intervals and the monitoring UEs that are interested in these messages read them and process them. This model may be referred to as "I am here" since the announcing UE would broadcast information about itself e.g., its ProSe Application Code in the discovery message.

Model B ("Who is There?"/"Are You There?"):

This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer's request.

It can be referred to as "who is there/are you there" since the discoverer UE sends information for other UEs that would like to receive responses, e.g., the information can be about a ProSe Application Identity corresponding to a group and the members of the group can respond.

The content of the discovery information is transparent to the Access Stratum (AS), and no distinction is made in the AS for ProSe Direct Discovery models and types of ProSe Direct Discovery. The ProSe Protocol ensures that it delivers only valid discovery information to AS for announcement.

The UE can participate in announcing and monitoring of discovery information in both RRC_IDLE and RRC_CONNECTED state as per eNB configuration. The UE announces and monitors its discovery information subject to the half-duplex constraints.

Resource Allocation for Discovery

D2D communication may either be network-controlled where the operator manages the switching between direct transmissions (D2D) and conventional cellular links, or the direct links may be managed by the devices without operator control. D2D allows combining infrastructure-mode and ad hoc communication.

Generally, device discovery is needed periodically. Further, D2D devices utilize a discovery message signaling protocol to perform device discovery. For example, a D2D-enabled UE can transmit its discovery message, and another D2D-enabled UE receives this discovery message and can use the information to establish a direct communication link. An advantage of a hybrid network is that if D2D devices are also in communication range of network infrastructure, network entities, like eNB, can additionally assist in the transmission or configuration of discovery messages. Coordination/control by the eNB in the transmission or configuration of discovery messages is also important to ensure that D2D messaging does not create interference with the cellular traffic controlled by the eNB. Additionally, even if some of the devices are outside of the network coverage range, in-coverage devices can assist in the ad-hoc discovery protocol.

At least the following two types of discovery procedure are defined for the purpose of terminology definition used further in the description.

UE autonomous resource selection (called Type 1 subsequently): A resource allocation procedure where resources for announcing discovery information are allocated on a non UE specific basis, further characterized by:
  The eNB provides the UE(s) with the resource pool configuration used for announcing of discovery information. The configuration may be e.g., signaled in SIB.
  The UE autonomously selects radio resource(s) from the indicated resource pool and announces discovery information.
  The UE can announce discovery information on a randomly selected discovery resource during each discovery period.

Scheduled resource allocation (called Type 2 subsequently): A resource allocation procedure where resources for announcing discovery information are allocated on a per-UE-specific basis, further characterized by:
  The UE in RRC_CONNECTED may request resource(s) for announcing of discovery information from the eNB via RRC. The eNB assigns resource(s) via RRC.
  The resources are allocated within the resource pool that is configured in UEs for monitoring.

For UEs in RRC_IDLE the eNB may select one of the following options:
  The eNB may provide a Type 1 resource pool for discovery information announcement in SIB. UEs that are authorized for Prose Direct Discovery use these resources for announcing discovery information in RRC_IDLE.
  The eNB may indicate in SIB that it supports D2D but does not provide resources for discovery information announcement. UEs need to enter RRC Connected in order to request D2D resources for discovery information announcement.

For UEs in RRC_CONNECTED:
  A UE authorized to perform ProSe Direct Discovery announcement indicates to the eNB that it wants to perform D2D discovery announcement
  The eNB validates whether the UE is authorized for ProSe Direct Discovery announcement using the UE context received from MME.
  The eNB may configure the UE to use a Type 1 resource pool or dedicated Type 2 resources for discovery information announcement via dedicated RRC signaling (or no resource).
  The resources allocated by the eNB are valid until a) the eNB de-configures the resource (s) by RRC signaling or b) the UE enters IDLE.

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Radio Protocol Architecture for ProSe Direct Discovery

FIG. 9 schematically illustrates a Radio Protocol Stack (Access Stratum) for ProSe Direct Discovery, where the access stratum protocol consists of only MAC and PHY.

The AS layer performs the following functions:
  Interfaces with upper layer (ProSe Protocol): The MAC layer receives the discovery message from the upper layer (ProSe Protocol). The IP layer is not used for transmitting the discovery message;
  Scheduling: The MAC layer determines the radio resource to be used for announcing the discovery message received from upper layer;
  Discovery PDU generation: The MAC layer builds the MAC PDU carrying the discovery message and sends the MAC PDU to the physical layer for transmission in the determined radio resource. No MAC header is added.

In the UE, the RRC protocol informs the discovery resource pools to MAC. RRC also informs allocated Type 2B resource for transmission to MAC. There is no need for a MAC header. MAC header for discovery does not comprise any fields based on which filtering on L2 could be performed. Discovery message filtering at the MAC level does not seem to save processing or power compared to performing filtering at the upper layers based on the Prose UE- and/or Prose Application ID. The MAC receiver forwards all received discovery messages to upper layers. MAC will deliver only correctly received messages to upper layers. It is assumed that L1 indicates to MAC whether a discovery messages has been received correctly. It is assumed that Upper Layers guarantee to deliver only valid discovery information to the Access Stratum.

ProSe UE-to-Network Relay

A UE may also support the function and procedure to act as a ProSe UE-to-Network Relay, such that a Remote UE communicates with the ProSe UE-to-Network Relay over the PC5 reference point. ProSe UE-to-Network Relay operation will be specified within 3GPP Release 13. So far, only initial agreements have been made in the 3GPP RAN working groups, some of which can be seen e.g., from 3GPP TS 23.303 current version 13.0.0 and TR 23.713 current version 1.4.0, incorporated herein by reference. Some of those agreements will be listed below. It should however be noted that this work item has been introduced very recently and thus is still in the process of standardization, such that any agreements assumed in the following can still be changed or reversed. Consequently, the following agreements shall be assumed for discussion purposes, however shall not be understood as limiting the invention to this particular 3GPP implementation.

For the ProSe UE-to-Network Relay discovery and ProSe relay (re)selection both scenarios where Remote UEs are in-coverage and out-of-coverage can be addressed.

Relay UE will always be in-coverage. The eNB at the radio level can control whether the UE can act as a relay, whereas whether the network control is per relay UE, per cell (broadcast configuration), or both, or something else is still undecided.

When Remote UE is in-coverage for relay discovery purposes, the monitoring and transmitting resources for discovery can be provided by the eNB using the Rel-12 mechanisms (broadcast for idle mode and dedicated signaling for connected mode). The remote UE can decide when to start monitoring.

When the Remote UE is out of coverage, the monitoring and transmitting resources for discovery and communication (actual data transfer) can be provided e.g., by pre-configuration i.e., by way of specification/operator configuration (in USIM, etc.) the UE exactly knows which resources to use.

ProSe UE-to-Network Relay (re)selection:

The Remote UE can take radio level measurements of the PC5 radio link quality into account for the ProSe UE-to-Network Relay selection procedure.

For the case that the Remote UE is out-of-coverage, the radio level measurements can be used by the remote UE together with other higher layer criteria to perform relay selection.

For the case that Remote UE is out-of-coverage, the criteria for reselection is based on PC5 measurements (RSRP or other RAN1 agreed measurements) and higher layer criteria. The relay reselection can be triggered by the remote UE.

For the case that Remote UE is in-coverage, it is not yet decided whether and how these measurements (PC5 measurements) are used (e.g., the measurements can be used by the UE to perform selection similar to out-of-coverage case, or they can be reported to the eNB).

The ProSe UE-to-Network relay may use layer-3 packet forwarding. Control information between ProSe UEs can be exchanged over the PC5 reference point, e.g., for UE-to-Network Relay detection and ProSe Direct Discovery.

A ProSe-enabled UE will also support the exchange of ProSe control information between another ProSe-enabled UE and the ProSe Function over the PC3 reference point. In the ProSe UE-to-Network Relay case, the Remote UE will send this control information over the PC5 user plane to be relayed over the LTE-Uu interface towards the ProSe Function.

The ProSe UE-to-Network Relay entity provides the functionality to support connectivity to "unicast" services for Remote UEs that are not in the coverage of an eNB, i.e., not connected to E-UTRAN. FIG. 10 shows a ProSe UE-to-Network Relay scenario. The ProSe UE-to-Network Relay shall relay unicast traffic (UL and/or DL) between the Remote UE and the network. The ProSe UE-to-Network Relay shall provide a generic function that can relay any type of traffic that is relevant for public safety communication.

One-to-one Direct Communication between Remote UEs and ProSe UE-to-Network Relays has the following characteristics:

Communication over PC5 reference point is connectionless.

ProSe Bearers are bi-directional. IP packets passed to the radio layers on a given ProSe bearer will be transmitted by the physical layer with the associated L2 destination address. IP packets passed up from the radio layers on the same ProSe bearer will have been received over the air addressed to the same L2 destination.

ProSe UE-to-Network Relaying may include the following functions:

ProSe Direct discovery following Model A or Model B can be used in order to allow the Remote UE to discover ProSe UE-to-Network Relay(s) in proximity.

ProSe Direct discovery that can be used in order to allow the Remote UE to discover L2 address of the ProSe UE-to-Network Relay to be used by the Remote UE for IP address allocation and user plane traffic corresponding to a specific PDN connection supported by the ProSe UE-to-Network Relay.

Act as an "announcing" or "discoveree" UE on the PC5 reference point supporting direct discovery.

Act as a default router to the Remote UEs forwarding IP packets between the UE-ProSe UE-to-Network Relay point-to-point link and the corresponding PDN connection.

Handle Router Solicitation and Router Advertisement messages as defined in IETF RFC 4861.

Act as DHCPv4 Server and stateless DHCPv6 Relay Agent.

Act as a NAT if IPv4 is used replacing the locally assigned IPv4 address of the Remote UE with its own.

Map the L2 link ID used by the Remote UE as Destination Layer-2 ID to the corresponding PDN connection supported by the ProSe UE-to-Network Relay.

The user plane protocol architecture for the ProSe UE-to-Network relay is shown in FIG. 11.

ProSe UE-to-Network Relay Discovery

Both Model A and Model B discovery are supported, as discussed before, where Model A uses a single discovery protocol message (UE-to-Network Relay Discovery Announcement) and Model B uses two discovery protocol messages (UE-to-Network Relay Discovery Solicitation and UE-to-Network Relay Discovery Response). Details on Relay Discovery can be found in section 6 of 3GPP TR 23.713 current version v1.4.0 incorporated herein by reference.

The following parameters are common to all of UE-to-Network Relay Discovery, Group Member Discovery and UE-to-UE Relay Discovery:

Message type: Announcement (Model A) or Solicitation/Response (Model B), Relay Discovery Additional Information (Model A).

Discovery type: indicates whether this is UE-to-Network Relay Discovery, Group Member Discovery or UE-to-UE Relay Discovery.

The following parameters are used in the UE-to-Network Relay Discovery Announcement message (Model A):

ProSe Relay UE ID: link layer identifier that is used for direct communication and is associated with a PDN connection the ProSe UE-to-Network Relay has established.

Announcer info: provides information about the announcing user.

Relay Service Code: parameter identifying a connectivity service the ProSe UE-to-Network Relay provides to Public Safety applications. The Relay Service Codes are configured in a ProSe UE-to-Network relay for advertisement and map in the ProSe UE-to-Network relay to specific APNs they offer connectivity to. Additionally, the Relay Service Code also identifies authorized users the ProSe UE-to-Network relay would offer service to, and may select the related security policies or information e.g., necessary for authentication and authorization between the Remote UE and the ProSe UE-to-Network Relay (e.g., a Relay Service Code for relays for police members only would be different than a Relay Service code for relays for Fire Fighters only, even though potentially they provided connectivity to same APN e.g., to support Internet Access).

Radio Layer Information: contains information about the radio layer information, e.g., radio conditions between the eNB and the UE-to-Network Relay, to assist the Remote UE selecting the proper UE-to-Network Relay.

The following parameters are used in the UE-to-Network Relay Discovery Solicitation message (Model B):

Discoverer info: provides information about the discoverer user.

Relay Service Code: information about connectivity that the discoverer UE is interested in. The Relay Service Codes are configured in the Prose Remote UEs interested in related connectivity services.

ProSe UE ID: link layer identifier of the discoverer that is used for direct communication (Model B).

The following parameters are used in the UE-to-Network Relay Discovery Response message (Model B):

ProSe Relay UE ID: link layer identifier that is used for direct communication and is associated with a PDN connection the ProSe UE-to-Network Relay has established.

Discoveree info: provides information about the discoveree.

Radio Layer Information: contains information about the radio layer information, e.g., radio conditions between the eNB and the UE-to-Network Relay, to assist the Remote UE selecting the proper UE-to-Network Relay.

FIG. 12 is a signaling diagram exemplarily illustrating the procedure for UE-to-Network Relay discovery according to Model A, as defined in the standard TR 23.713 current version 1.4.0 section 6.1.2.2.1. As discussed before, the relay UE (i.e., announcing UE) broadcasts the Relay Discovery Announcement message.

FIG. 13 is a signaling diagram exemplarily illustrating the procedure for UE-to-Network Relay discovery according to Model B, as defined in the standard TR 23.713 current version 1.4.0 section 6.1.2.2.2. As discussed before, the remote UE (i.e., discoverer UE) searching for a relay broadcasts a Relay Discovery Solicitation message. In this exemplary scenario it is assumed that two of the discoverees (i.e., relay UEs) respond with a corresponding Relay Discovery Response message.

ProSe Direction Communication Via the ProSe UE-to-Network Relay

The UE-to-Network Relay function will be specified based upon an evolution of the ProSe functionality already documented in TS 23.303.

A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). PDN connection(s) supporting UE-to-Network Relay shall only be used for Remote ProSe UE(s) relay traffic. FIG. 14 illustrates the direct communication via a ProSe UE-to-Network Relay.

1. The ProSe UE-Network Relay performs initial E-UTRAN Attach (if not already attached) and/or establishes a PDN connection for relaying (if no appropriate PDN connection for this relaying exists yet). In case of IPv6, the ProSe UE-Network Relay obtains an IPv6 prefix via prefix delegation function from the network as defined in TS 23.401.

2. The Remote UE performs discovery of a ProSe UE-Network Relay using Model A or Model B discovery. The details of this procedure were described before in connection with FIGS. 12 and 13.

3. The Remote UE uses the received relay selection information to select a ProSe UE-Network Relay and then establishes a connection for One-to-One Communication as discussed before with reference to FIG. 3.

4. When IPv6 is used on PC5, the Remote UE performs IPv6 Stateless Address auto-configuration, where the Remote UE shall send a Router Solicitation message (step 4a) to the network using as Destination Layer-2 ID the Layer-2 ID of the Relay in order to solicit a Router Advertisement message (step 4b) as specified in IETF RFC 4862. The Router Advertisement messages shall contain the assigned IPv6 prefix. After the Remote UE receives the Router Advertisement message, it constructs a full IPv6 address via IPv6 Stateless Address auto-configuration in accordance with IETF RFC 4862. However, the Remote UE shall not use any identifiers defined in TS 23.003 as the basis for generating the interface identifier. For privacy, the Remote UE may change the interface identifier used to generate the full IPv6 address, as defined in TS 23.221 without involving the network. The Remote UE shall use the auto-configured IPv6 address while sending packets.

5. When IPv4 is used on PC5, the Remote UE uses DHCPv4. The Remote UE shall send DHCPv4 Discovery (step 5a) message using as Destination Layer-2 ID the Layer-2 ID of the Relay. The ProSe UE-Network Relay acting as a DHCPv4 Server sends the DHCPv4 Offer (step 5b) with the assigned Remote UE IPv4 address. When the Remote UE receives the lease offer, it sends a DHCP REQUEST message containing the received IPv4 address (step 5c). The ProSe UE-Network Relay acting as DHCPv4 server sends a DHCPACK message to the Remote UE (step 5d) including the lease duration and any other configuration information that the client might have requested. On receiving the DHCPACK message, the Remote UE completes the TCP/IP configuration process.

As has been explained above, 3GPP introduces as a major work item the ProSe relay functionality, which includes relay discovery and relay direct communication. Some of the currently-defined mechanisms for ProSe relay are rather inefficient.

BRIEF SUMMARY

Non-limiting and exemplary embodiments provide improved methods for the discovery mechanism(s) used to discover relay user equipment(s) by remote user equipment(s). The independent claims provide non-limiting and exemplary embodiments. Advantageous embodiments are subject to the dependent claims.

According to several aspects described herein, the discovery mechanism performed by remote user equipment to discover relay user equipments is improved. At the basis for explaining these aspects, the following assumptions are made. In particular, it is assumed that the relay user equipment is capable to perform direct communications with other remote user equipments as well as capable of acting as a relay for other remote user equipments. As explained in the specific and exemplary 3GPP embodiments of the background section, direct discovery is generally used by remote user equipments in order to find available relay user equipments, one of which can then be selected and used as a relay for connecting to the radio base station of the cell. A one-to-one connection is established between the remote user equipment and the selected relay user equipment over which direct communication can be performed.

According to a first aspect, the discovery mechanism used between relay user equipment and remote user equipments is enhanced particularly for those situations where the relay user equipment is overloaded and thus is more or less prevented to act as a relay for additional remote user equipments. In other words, for example because the relay user equipment is already serving as a relay for one or more remote user equipments, an overload situation might exist in the relay user equipment such that the relay user equipment would be at a limit and would not be able to serve as a relay for additional (i.e., further) remote user equipments. This might have various reasons, such as an overload situation with regard to the hardware of the relay user equipment (such as the processor, memory, ports, transmission capability, etc.) or with regard to other issues such as the number of usable logical channel IDs, available buffer size (at L2, L3, etc.), remaining physical layer data transmission capabilities. For instance, no further logical channel ID is available to set up an additional connection for serving as relay for a further remote user equipment.

If the remote user equipments do not know about this overload situation of the relay, they may select this overloaded relay user equipment, and thus may eventually not be able to use this particular overloaded relay user equipment as relay. In that case, after this first relay user equipment selection fails, another relay user equipment needs to be selected, thus incurring a delay in the relay selection process. Furthermore, the processing load in the relay is increased by the corresponding connection requests initiated by the remote user equipment which then is assumed to fail due to the overload situation.

According to the first aspect, the relay user equipment is enhanced so as to determine whether an overload situation exists in the relay user equipment.

The overload situation may exist due to one or more of various reasons already listed above (e.g., processor, memory, logical channel IDs, memory/buffer size, L1 transmission capabilities)), and the relay user equipment may check these e.g., one by one or simultaneously. In any case, the relay user equipment will monitor itself so as to determine whether it is able to serve as a relay for further remote user equipments or whether any of its components is overloaded and thus whether serving as a relay for a further remote user equipment would not be possible (or at least would not be desirable).

The overload situation in this context should be understood as a temporary situation during which the relay user equipment is inhibited from serving as a relay for a further remote user equipment, i.e., inhibited from accepting serving as a relay for a further remote user equipment. Also, the situation is temporary in that it may change rapidly back and forth. The overload situation in this context may additionally be understood as being caused by relay processing in the relay user equipment itself. For instance, the relay user equipment is already serving as a relay for one or more remote user equipments and is thus "overloaded"; e.g., no more ports or logical channel IDs are available to be assigned to a further connection for relaying communication data of a further remote user equipment.

As such the overload situation should be distinguished from e.g., a low battery which in general is not something that will change rapidly between being low and high, as is the case with the overload situation as explained above. This would also be in contrast e.g., to the capability of the relay user equipment which in principle does not change over time at all or managed by some operator by e.g., reconfiguring the USIM over the air but still seldom.

This overload determination may be performed by the relay e.g., at regular intervals or at predefined times. For instance, the overload determination could be performed (in a timely manner) at least every time a relay discovery message is to be transmitted/broadcast. In any case, the relay user equipment will monitor for overload situations and react accordingly as explained in the following.

Particularly, the relay discovery messages that are transmitted/broadcast by the relay user equipment are extended so as to comprise an overload indication providing information on whether the relay user equipment is in an overload situation as determined before. The overload indication value is set according to the overload situation in the relay user equipment, e.g., one value indicating that no overload situation exists, and the other value conversely indicating that an overload situation exists. Correspondingly, the relay discovery messages indicate the overload status of the relay user equipment, which can thus be used by the remote user equipment(s) during the relay (re)selection procedure.

In particular, the remote user equipment shall preferably not select (and connect to) a relay user equipment, which already indicates by use of the above-mentioned overload indication in the relay discovery message(s) that it is currently in an overload state and cannot/does not want to serve as a relay for a further remote user equipment. Consequently, since the remote user equipment(s) do not select the overloaded relay user equipment and thus refrain from connecting to same, no delay in the relay (re)selection process is generated and also no additional processing load is incurred in the relay user equipment.

The first aspect as explained above is equally applicable to the discovery procedure according to Model A and Model B, as generally explained in the detailed embodiments of the background section. In particular, the relay discovery message, which is extended with the overload indication according to the first aspect, may either be a message which is transmitted after receiving a relay solicitation message from a remote user equipment (i.e., Model B) or is a message which is periodically transmitted by the relay (i.e., Model A). Therefore, the first aspect is advantageously applicable to both discovery models.

In variants of the first aspect, the relay discovery message may be further extended, in addition to the overload indication, by additional information on the overload situation. For instance, information can be included in the relay discovery message regarding a remaining time which the overload situation is estimated to last. Or, information can be included in the relay discovery message regarding a particular uplink and/or downlink direction the overload situation is confined to; e.g., the link from/to the remote user equipment to/from the relay user equipment may be congested (i.e., uplink/downlink on the PC5 interface), and/or the link from/to the relay user equipment to/from the radio base station may be congested (i.e., uplink/downlink on the Uu interface).

According to a second aspect, the direct discovery procedure for relay user equipments is improved as well although differently from the above discussed first aspect. So as to discuss this second aspect, basically the same assumptions can be made as for the first aspect. For instance, the relay user equipment shall be capable to perform direct communication with other user equipments as well as being capable of acting as a relay for other remote user equipments. In the same manner as for the first aspect, the second aspect also involves determining whether or not the relay user equipment is in an overload situation. So as to avoid repetition, reference is made to the above discussion as to what the determination of the overload situation entails (e.g., when and how, etc.).

Instead of extending the relay discovery messages with an overload indication, the second aspect foresees to transmit the relay discovery message on different resources depending on whether the relay is determined to be overloaded or not such that those remote user equipments which the relay user equipment is already serving as a relay may continue to receive the relay discovery message(s) while other yet-unserved remote user equipments will not discover the overloaded relay which is thus practicably invisible to remote user equipment which it is currently not serving.

In more detail, as mentioned above, different sets of radio resources shall be used by the relay to transmit the relay discovery messages. A first set of radio resources may be configured such that all remote user equipments (e.g., served and unserved) can monitor the radio resources for receiving relay discovery messages from this relay user equipment; for instance, suitable radio resources may be preconfigured (e.g., in the USIM of the UEs) such that any remote user equipments, in coverage or out of coverage of the radio base station, will know the first set of radio resources to monitor for relay discovery messages.

In contrast thereto, the second set of radio resources, which shall be used by the relay to transmit the relay discovery messages when being overloaded, shall only be monitored by those remote user equipments which are already being served by this relay user equipment. Consequently, any new remote user equipment trying to discover an overloaded relay user equipment (either according to Model A or Model B), that is listening to the first set of radio resources and not to the second set of radio resources, will thus not receive relay discovery messages transmitted from relay user equipments which are in an overload situation. On the other hand, relay user equipments which are not overloaded, will use the general first set of radio resources to transmit relay discovery messages and thus will be visible to any new remote user equipment trying to discover suitable relays.

By distinguishing between the two sets of radio resources for transmitting the relay discovery message(s) depending on the overload status of the relay, it is possible to stay visible to those remote user equipments which are already served while turning temporarily invisible for any new remote user equipments which are currently trying to discover suitable relay user equipments.

Furthermore, it is particularly advantageous for the served remote user equipments to be able to continue receiving the relay discovery messages even when an overload situation exists in the relay, namely in case the relay discovery messages are used to synchronize the time and frequency of the remote user equipment with the relay user equipment.

According to one exemplary variant of the second aspect, the second set of radio resources is not preconfigured but can be determined by the relay user equipment, which then informs the served remote user equipment(s). Thereby, it is ensured that only those remote user equipments which are currently being served by the relay user equipment know about the second set of resources to be monitored for relay discovery messages when the relay is in an overload state.

According to a further exemplary variant of the second aspect, those remote user equipments which are already served by the relay, will only monitor one set of resources, be it the first or the second set of resources, depending on the overload status of the relay. To said end, the served remote user equipments must be informed about a change of the overload status such that the "correct" set of radio resources is monitored for receiving relay discovery messages. Advantageously, the served remote user equipments do not need to monitor both sets of radio resources, but only the suitable set of resources which is actually used by the relay user equipment to transmit the relay discovery message depending on the overload status.

Also the second aspect is equally applicable to the discovery procedure according to Model A and Model B, as generally explained in the detailed embodiments of the background section. In particular, the relay discovery message may either be a message which is transmitted (on the first or second set of radio resources) after receiving a relay solicitation message from a remote user equipment (i.e., Model B). Or, the relay discovery message is a message which is periodically transmitted by the relay (i.e., Model A). Therefore, the first aspect is advantageously applicable to both discovery models.

According to a third aspect, the direct discovery procedure for relay user equipments is improved as for the first and second aspects. Basically the same assumptions can be made as for the first and second aspects to. For instance, the relay user equipment shall be capable to perform direct communication with other remote user equipments as well as being capable of acting as the relay for remote user equipments. Furthermore, it is assumed for the third aspect that the relay user equipment is performing direct discovery according to Model A which includes transmitting relay discovery messages in a periodic fashion, i.e., with a time interval between the respective relay discovery messages. In the same manner as for the first and second aspects, the third aspect also involves determining whether or not the relay user equipment is in an overload situation. So as to avoid repetition, reference is made to the above discussion as to what the determination of the overload situation entails (e.g., when and how, etc.).

The third aspect foresees to transmit the relay discovery messages with different periodicities depending on whether the relay is determined to be overloaded or not, such that any new remote user equipments will be prevented/delayed from discovering and selecting the overloaded relay user equipment. In particular, according to the third aspect, the relay user equipment, when being in an overloaded situation, shall increase the periodicity of the relay discovery message transmission, i.e., increase the time interval between the transmissions of subsequent relay discovery messages. In other words, the direct discovery mechanism in the relay user equipment is adapted so as to transmit the relay discovery messages less frequently when being in an overload situation compared to when the relay user equipment is not overloaded. In one exemplary implementation of the third aspect, the periodicity may be increased so far that in practice no relay discovery message is transmitted anymore by the relay user equipment when being in an overload state.

Correspondingly, in one general first aspect, the techniques disclosed here feature a method for discovery of one or more relay user equipments within a mobile communication network. A relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. The relay user equipment determines whether an overload situation exists in the relay user equipment or not, the overload situation preventing the relay user equipment to serve as a relay for a further remote user equipment. The relay user equipment transmits a relay discovery message, at least comprising an overload indication providing information on the result of the determination as to whether the overload situation exists in the relay user equipment.

Correspondingly, in one general first aspect, the techniques disclosed here feature a relay user equipment for participating in the relay discovery within a mobile communication network. The relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. A processor of the relay user equipment determines whether an overload situation exists in the relay user equipment or not, the overload situation preventing the relay user equipment to serve as a relay for a further remote user equipment. A transmitter of the relay user equipment transmits a relay discovery message, at least comprising an overload indication providing information on the result of the determination as to whether the overload situation exists in the relay user equipment.

Correspondingly, in one general first aspect, the techniques disclosed here feature a remote user equipment for discovering one or more relay user equipments within a mobile communication network. A relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. A receiver of the remote user equipment receives a relay discovery message, at least comprising an overload indication providing information on a result of a determination in the relay user equipment as to whether an overload situation exists in the relay user equipment, the overload situation preventing the relay user equipment to serve as a relay for a further remote user equipment. A processor of the remote user equipment processes the overload indication so as to not select the relay user equipment as relay.

Correspondingly, in one general first aspect, the techniques disclosed here feature another method for discovery of one or more relay user equipments within a mobile communication network. A relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. The relay user equipment determines whether an overload situation exists in the relay user equipment or not, the overload situation preventing the relay user equipment to serve as a relay for a further remote user equipment. The relay user equipment transmits a relay discovery message. In case it is determined that an overload situation does not exist in the relay user equipment, the relay discovery message is transmitted on a first set of radio resources being monitored by the one or more remote user equipments. On the other hand, in case it is determined that an overload situation does exist in the relay user equipment, the relay discovery message is transmitted on a second set of radio resources being monitored by those remote user equipments which are already using the relay user equipment as relay but not remote user equipments which are not using the relay user equipment as relay.

Correspondingly, in one general first aspect, the techniques disclosed here feature a relay user equipment for participating in the relay discovery within a mobile communication network. The relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. A processor of the relay user equipment determines whether an overload situation exists in the relay user equipment or not, the overload situation preventing the relay user equipment to serve as a relay for a further remote user equipment. A transmitter of the relay user equipment transmits a relay discovery message. In case it is determined that an overload situation does not exist in the relay user equipment, the relay discovery message is transmitted on a first set of radio resources being monitored by the one or more remote user equipments. In case it is determined that an overload situation does exist in the relay user equipment, the relay discovery message is transmitted on a second set of radio resources being monitored by those remote user equipments which are already using the relay user equipment as relay but not remote user equipments which are not using the relay user equipment as relay.

Correspondingly, in one general first aspect, the techniques disclosed here feature a remote user equipment for discovering one or more relay user equipments within a mobile communication network. A relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. A receiver of the remote user equipment monitors a first set of radio resources, wherein the first set of radio resources is used by the relay user equipment to transmit a relay discovery message in case the relay user equipment determines that an overload situation, preventing the relay user equipment to serve as a relay for a further remote user equipment, does not exist in the relay user equipment. The receiver of the remote user equipment monitors a second set of radio resources, wherein the second set of radio resources is used by the relay user equipment to transmit the relay discovery message in case the relay user equipment determines that an overload situation does exist in the relay user equipment. The second set of radio resources monitored by the remote user equipment in case the remote user equipment is already using the relay user equipment as relay but not in case the remote user equipment is not using the relay user equipment as relay. The receiver further receives the relay discovery message from the relay user equipment.

Correspondingly, in one general first aspect, the techniques disclosed here feature another method discovery of one or more relay user equipments within a mobile communication network. A relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. The relay user equipment is configured to periodically transmit relay discovery messages with a time interval in between. The relay user equipment determines whether an overload situation exists in the relay user equipment or not, the overload situation preventing the relay user equipment to serve as a relay for a further remote user equipment. In case it is determined that an overload situation does not exist in the relay user equipment, the relay user equipment sets the time interval for periodically transmitting the relay discovery message to a first value. In case it is determined that an overload situation does exist in the relay user equipment, the relay user equipment sets the time interval for periodically transmitting the relay discovery message to a second value, wherein the second value is higher than the first value.

Correspondingly, in one general first aspect, the techniques disclosed here feature a relay user equipment for participating in the relay discovery within a mobile communication network. The relay user equipment is capable to perform direct communication over a direct sidelink connection respectively with one or more remote user equipments. The relay user equipment is connected to a radio base station in the mobile communication network and is further capable to serve as a relay respectively for the one or more remote user equipments so as to relay communication between the one or more remote user equipments and the radio base station. The relay user equipment is configured to periodically transmit relay discovery messages with a time interval in between. A processor of the relay user equipment determines whether an overload situation exists in the relay user equipment or not, the overload situation preventing the relay user equipment to serve as a relay for a further remote user equipment. The processor sets the time interval for periodically transmitting the relay discovery message to a first value, in case it is determined that an overload situation does not exist in the relay user equipment. The processor sets the time interval for periodically transmitting the relay discovery message to a second value, in case it is determined that an overload situation does exist in the relay user equipment, wherein the second value is higher than the first value.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE DRAWINGS

In the following exemplary embodiments are described in more detail with reference to the attached figures and drawings.

DETAILED DESCRIPTION

Figure 1:
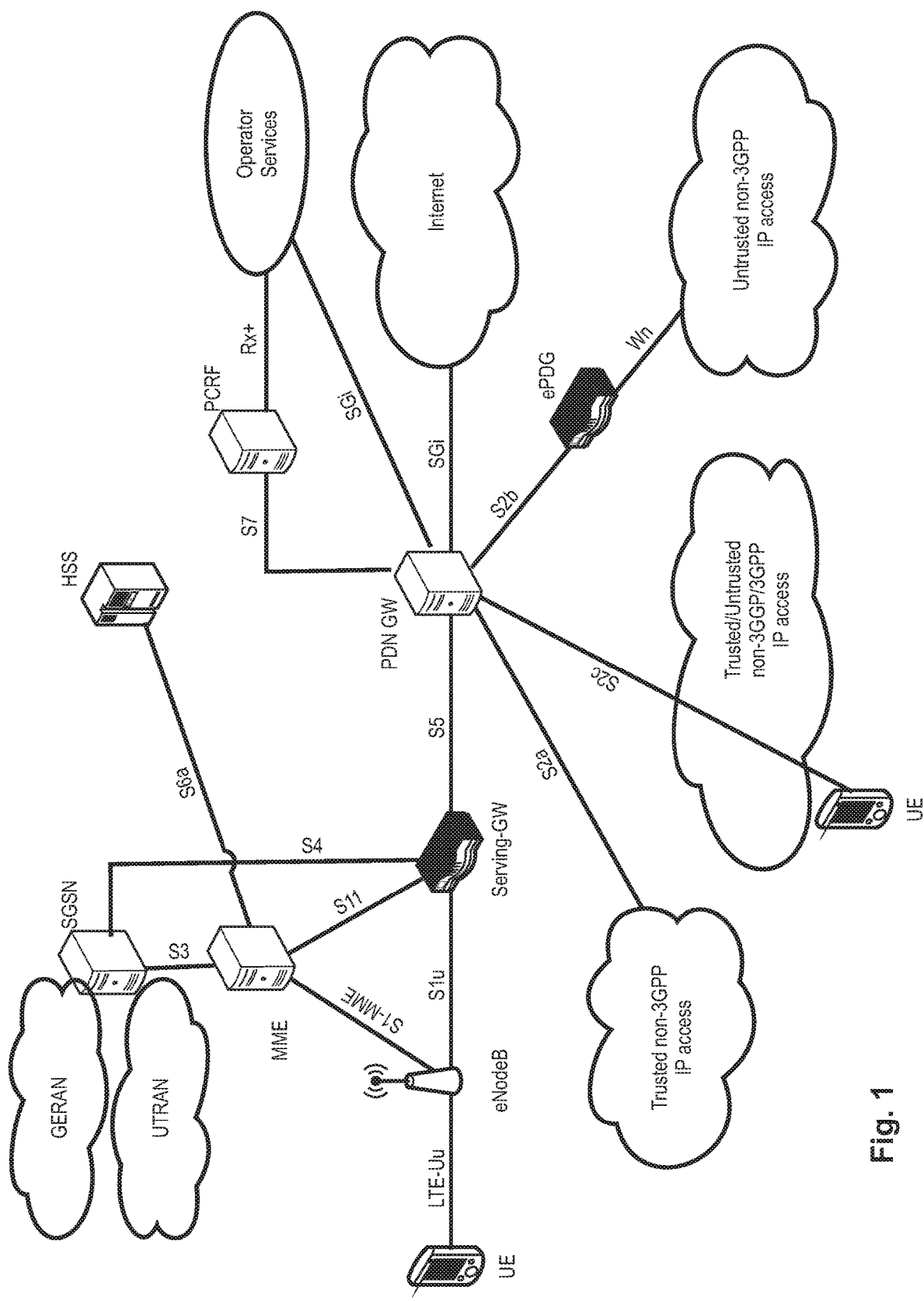
FIG. 1 shows an exemplary architecture of a 3GPP LTE system.
Figure 2:
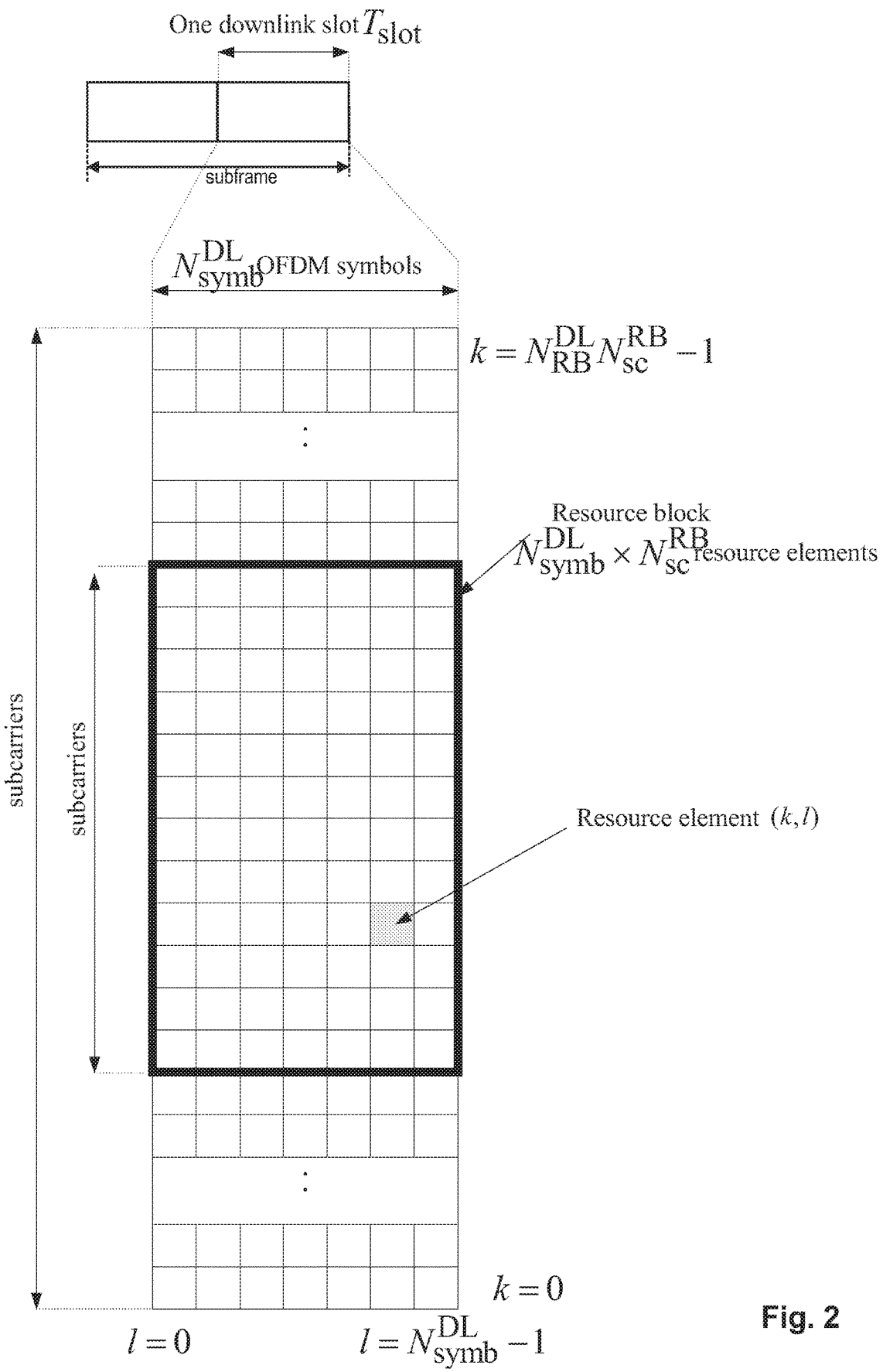
FIG. 2 shows an exemplary downlink resource grid of a downlink slot of a subframe as defined for 3GPP LTE (Release 8/9), FIG. 3 schematically illustrates how to establish a layer-2 link over the PC5 for ProSe communication.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

A "relay user equipment" as used in the set of claims and in the application is to be broadly understood as referring to a user equipment which is capable of serving as a relay for another user equipment (termed "remote user equipment"). This also involves the capability of supporting direct communication transmissions directly between two user equipments (see below D2D or ProSe). According to one implementation, the relay user equipment shall support relay functionality as defined for 3GPP LTE-A and as described in the background section. In said connection, the term "remote user equipment" shall merely indicate the role of the user equipment as being the peer of the relay user equipment, i.e., looking for a relay to establish direct communication with.

The term "radio resources" as used in the set of claims and in the application is to be broadly understood as referring to physical radio resources, such as time-frequency resources.

The term "direct communication transmission" as used in the set of claims and in the application is to be broadly understood as a transmission directly between two user equipments, i.e., not via the radio base station (e.g., eNB). Correspondingly, the direct communication transmission is performed over a "direct sidelink connection", which is the term used for a connection established directly between two user equipments. For example, in 3GPP the terminology of D2D (Device-to-Device) communication is used or ProSe communication, or a sidelink communication. The term "direct sidelink connection" as used in the set of claims and in the application is to be broadly understood and can be understood in the 3GPP context as the PC5 interface described in the background section.

The term "overload situation" as used in the set of claims and in the application is to be broadly understood as a particular situation existing for the relay user equipment which either prevents or seriously inhibits the relay to serve as a relay for further remote user equipments; i.e., for any new remote user equipment in addition to any (if at all existing) remote user equipments already served. The functional definition of "preventing or seriously inhibiting the relay to serve as a relay" shall not be interpreted narrowly in that it is impossible for a relay user equipment to serve as a relay for a further single remote user equipment. Rather, an overload situation may be defined flexibly for a relay user equipment, for instance by defining particular limits at which it is understood that an efficient operation of the relay user equipment is ensured. The overload might refer to any of the hardware or software components of the relay user equipment, such as the processor, memory, ports, logical channel IDs, available bandwidths in uplink/downlink, etc. The overload is characterized as being temporary since it may rapidly change. Additionally or alternatively, the overload may be understood as being caused by the relay processing already performed in the relay user equipment due to serving other relay user equipments. The term "overload indication" shall be understood in a corresponding manner.

The currently-standardized direct discovery procedure to be performed by UEs for discovering relay user equipments is at the early stages, and, although similar to the direct discovery to be performed by UEs to discover other UEs, is still different in many aspects. One disadvantage that the inventors have identified is that currently no mechanism is foreseen to prevent remote UEs to select a particular relay UE where the relay UE is e.g., overloaded and thus unable to serve as a relay for a new further remote UE. For instance, one or more of the various software or hardware components of the relay user equipment may be overloaded (i.e., at its or very near its limit), such as memory processor, ports, logical channel IDs, available bandwidths in the uplink/downlink direction in the PC5/uu interface, etc.

An exemplary scenario would be that a relay UE is already serving one or more remote UEs, with the consequence that its capabilities are already overloaded/limited, in which case the relay UE is not interested in or even unable to serve as relay for an additional remote UE.

However, since no mechanism is provided at the moment to take these scenarios into account, the remote UE(s) would not know about the overload situation of the relay and, after discovering same, might select the overloaded relay with the expectation to set up a connection. In consequence, the overloaded relay may either reject the relay selection by the remote UE or even when accepting the relay selection (and thus allowing the direct connection to be established between the relay and the remote UE), the overloaded relay may not be able to serve the remote UE as required due to the overload in one or several of its components. This may result in that the remote UE may have to eventually perform a relay reselection to select a new (hopefully not overloaded) relay, which entails a delay. Furthermore, the connection request/attempt of the remote UE with the overloaded relay in turn further increases the load in the relay.

The following exemplary embodiments are conceived by the inventors to mitigate the problems explained above.

Particular implementations of the various embodiments are to be implemented in the wide specification as given by the 3GPP standards and explained partly in the background section, with the particular key features being added as explained in the following pertaining to the various embodiments. It should be noted that the embodiments may be advantageously used for example in a mobile communication system, such as 3GPP LTE-A (Release 10/11/12/13) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the invention and its embodiments as such.

For illustration purposes, several assumptions are made which however shall not restrict the scope of the following embodiments. For one thing, user equipments are assumed which are enabled to perform ProSe communication (ProSe-enabled UEs), i.e., direct D2D transmissions directly between UEs without the detour via the eNodeB. Furthermore, at least one of these (ProSe-enabled UEs) in the scenario shall support relay functionality as explained in the background section for the specific implementation in Release 13 of 3GPP standards. In other words, this relay UE shall be capable to serve as a relay to other (ProSe-enabled) UEs (remote UEs) thereby allowing these remote UEs to connect, via the relay, to the eNB.

Furthermore, as mentioned above, the following embodiments may be implemented in the 3GPP LTE-A (Rel. 12/13) environment. The various embodiments mainly provide improvements to the direct discovery procedure performed between relay UEs and remote UEs, such that other functionality (i.e., functionality not changed by the various embodiments) may remain exactly the same as explained in the background section or may be changed without any consequences to the various embodiments. For instance, the establishment of the direct (relay) communication with the relay UE might stay the same.

First Embodiment

In the following a first embodiment for solving the above problem will be described in detail. Implementations of the first embodiment will be explained in connection with FIGS. 15 to 18.

According to the first embodiment, an overload indication is introduced into the discovery procedure, which allows the relay UE to indicate (and the receiving remote UE(s) to learn) whether the corresponding relay UE is overloaded or not. In case the relay UE indicates, by use of the overload indication, that the relay UE is overloaded, the remote UE(s) shall not select the corresponding overloaded relay but another available (not overloaded) relay discovered during the discovery process. As such, by extending the discovery mechanism with the overload indication, the overload state of the relay UE(s) can be taken into account during the direct discovery so as to avoid delaying the relay selection and to avoid further increasing the load in the overloaded relay.

The relay UE might be overloaded for several reasons, be it hardware or software. In particular, a really UE may be in an overloaded situation because one or several of its (hardware) components are already working at their respective limits. For instance, the processor, memory, ports, available buffer size at layer 2, layer 3, of the relay UE may be overloaded. There also may be other reasons such as that the relay UE lacks usable logical channel IDs or the necessary physical layer data transmission capability to support relaying further remote UE(s). Any of the above mentioned reasons might prevent that the relay UE serves as relay for a further remote user equipment, or at least seriously restricts the relay UE's capability to serve as a relay for an additional remote UE.

This obstacle for serving as a relay may be of a temporary nature and can thus change rapidly back and forth, as e.g., the case with the processor load. Also, a logical channel ID of the relay UE may be suddenly freed when terminating an own communication PDN connection or when stopping to serve as a relay for a previous remote UE. Furthermore, the overload situation may be also caused in the relay UE because of already serving one or more remote UEs.

Consequently, the overload situation shall be distinguished from for example a low battery status of the relay UE, which should not be understood per se as an overload. For instance, the low battery normally will only gradually come into existence and become a problem, while one characteristic of the overload situation is that it may rapidly change back and forth. Also, in case of low battery, the Relay device could use the PPI (Power Preference Indicator; "powerPrefindicationConfig" of 3GPP TS 36.331 V12.6.0) indication to the eNB to help save some battery; however, this is not possible for an overload situation (since the eNB e.g., cannot by itself selectively take off/release some Remote Bearer(s) being served by 'this' Relay).

The relay UE shall thus monitor its own system in order to identify overload in one or several of its components and thus to determine whether it is in an overload situation or not. This may be done regularly, or at particular time instances e.g., when (or shortly before) transmitting a relay discovery message to allow remote UEs to discover the relay UE. By monitoring the overload status of the relay UE, the relay UE may thus at any time set the corresponding value of the overload indication during direct discovery in accordance with its current state of overload.

As already hinted above, the first embodiment of the invention shall improve the direct discovery mechanism by extending the relay discovery messages transmitted by a relay UE with an appropriate overload indicator. In particular, the relay UE transmits discovery messages according to model A or model B, which are extended according to the first embodiment so as to comprise an overload indication having a value reflecting the current overload state of the relay UE. Put differently, the usual relay direct discovery message(s) transmitted/broadcasted by the relay UEs are reused and extended with the overload indication to allow the improvement according to the first embodiment.

Figure 12:
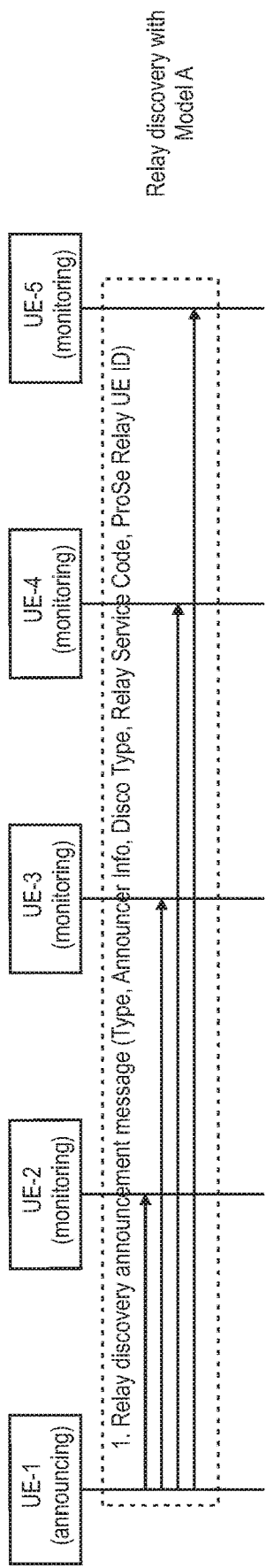
FIG. 12 is a signaling diagram exemplarily illustrating the procedure for UE-to-Network Relay discovery according to Model A.
Figure 13:
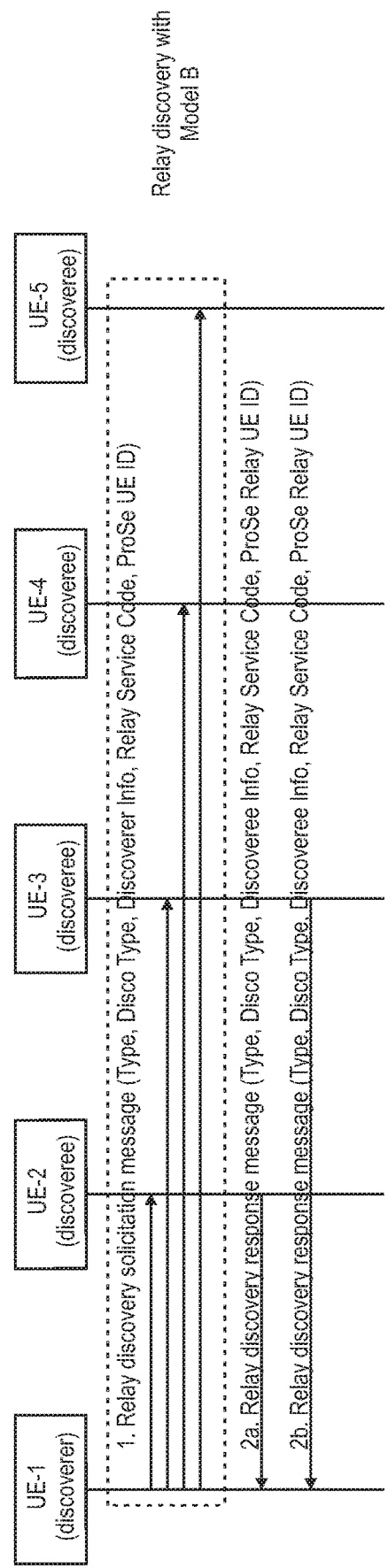
FIG. 13 is a signaling diagram exemplarily illustrating the procedure for UE-to-Network Relay discovery according to Model B.
Figure 15:
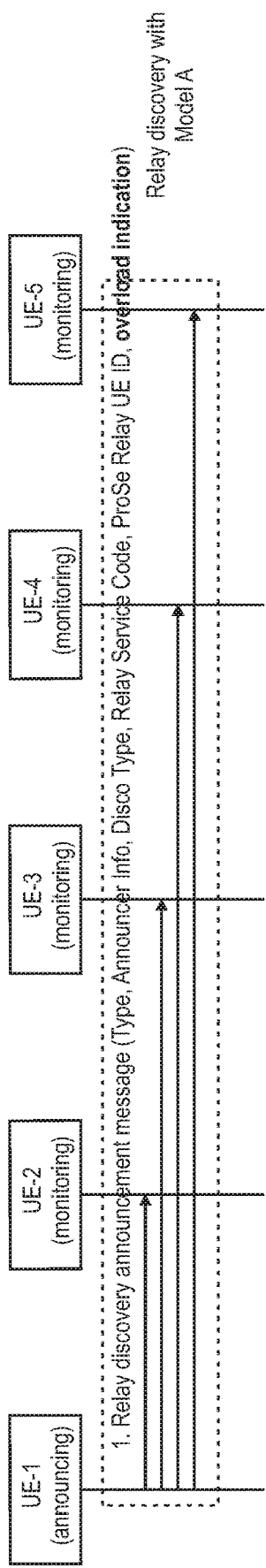
FIG. 15 is a signaling diagram exemplarily illustrating the procedure for UE-to-Network Relay discovery according to Model A according to an exemplary implementation of the first embodiment.
Figure 16:
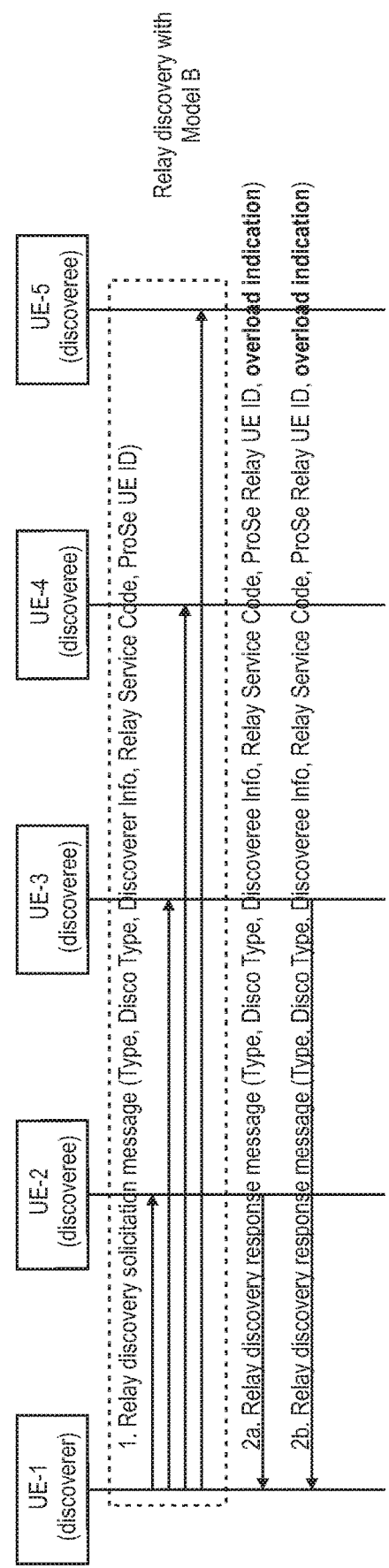
FIG. 16 is a signaling diagram exemplarily illustrating the procedure for UE-to-Network Relay discovery according to Model B according to an exemplary implementation of the first embodiment.

Correspondingly enhanced discovery messages are illustrated in FIGS. 15 and 16, where FIG. 15 discloses the extended relay discovery announcement message according to the direct discovery with Model A (also see FIG. 12), and FIG. 16 illustrates the extended relay discovery response message according to direct discovery with Model B (also see FIG. 13). As apparent from both of these figures, the messages comprise an overload indication.

In its simplest form, the overload indication, having to distinguish between merely two different states (i.e., overloaded and not overloaded), can be implemented by a simple one bit flag, where each of the two values respectively indicates one of the states. Of course, the overload indication may also be implemented differently; some other examples are presented further below.

Figure 17:
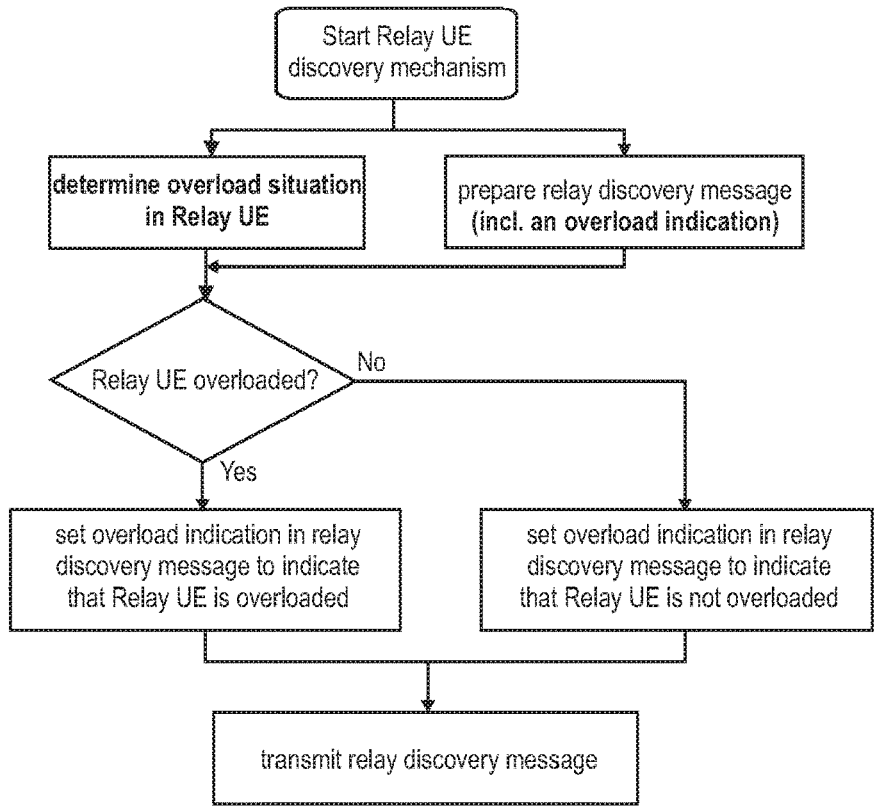
FIG. 17 is a sequence diagram illustrating the relay UE behavior according to an exemplary implementation of the first embodiment.
Figure 18:
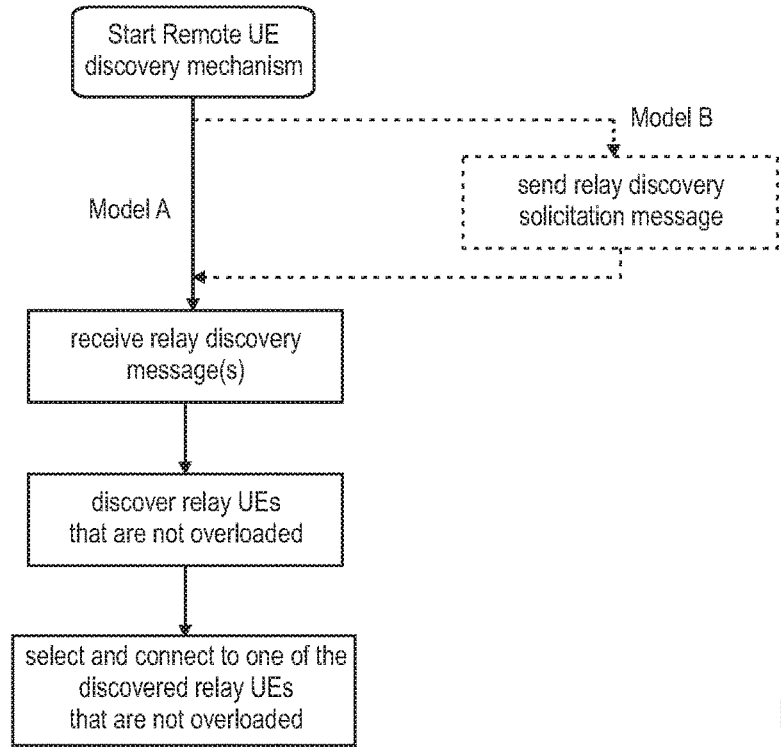
FIG. 18 is a sequence diagram illustrating the remote UE behavior according to an exemplary implementation of the first embodiment.

FIG. 17 is an exemplary sequence process diagram illustrating the relay UE processing according to a general first embodiment. On the other hand, FIG. 18 is an exemplary sequence process diagram illustrating the remote UE processing according to a general first embodiment.

The corresponding relay discovery message transmitted by the relay UE (either according to model A or model B) is received by the remote UE(s), which are able to process the new information element (overload indication) and thus can determine from the overload indication whether the just-discovered relay UE is overloaded or not and whether the same shall be selected or not for serving as its relay. Preferably of course, the remote UE receiving the indication that the relay UE is overloaded shall abstain from selecting said overloaded relay UE after its discovery, and shall rather select a different relay UE to serve as its relay.

In consequence, the first embodiment provides a simple and effective mechanism to take overload states of the relay UEs into account and thus to avoid redundant connections setups with an overloaded relay, thus expediting the relay (re)selection of remote UEs as well as reducing excess overload in the overloaded relay UEs.

In advantageous implementations of the first embodiment, the overload indication is further enhanced to provide more detailed information on the overload situation in the relay UE. In other words, the relay discovery messages do not only provide the above-discussed indication as to whether the corresponding relay UE is overloaded or not, but shall comprise additional information on the overload state providing further advantages.

According to a first implementation, the relay discovery message(s) may comprise time information of the overload state, the time information (if present) indicating how much time the overload state is expected to last in the relay UE. In particular, depending on the kind of overload state in the relay UE, the relay UE may be able to reliably estimate how long the overload is going to last. For instance, in case the overload is due to a lack of remaining logical channel IDs in the relay user equipment, and the termination of a particular PDN connection (and thus the release of a logical channel ID) is soon to be expected, the relay UE may already foresee that the overload situation will be cease to exist within a particular time. In said case, the relay discovery message(s) may additionally provide information as to when the remote UE(s) may expect the overload situation of the relay UE to terminate. This time information may be encoded into the relay discovery message separately or in combination with the previously discussed overload indicator. For instance, the overload indication may still be implemented as a simple one bit flag while the time information can be for instance implemented by a x-bit field (allowing a more or less granular time indication). On the other hand, the overload might be implicitly included into the time information in that a time of 0 may be understood by the remote UE(s) as an indication that no overload state exists, while any time indication larger (different) than 0 will be understood as indicating that the relay UE is overloaded. It should be noted that such a time indication might not be possible for particular overload reasons such that it may not always be sensible to include such a time indication in the relay discovery messages. Correspondingly, such time communication might only be included in that the relay discovery messages for specific overload states, such as the missing logical channel IDs, but not for other overload states.

Figure 6:
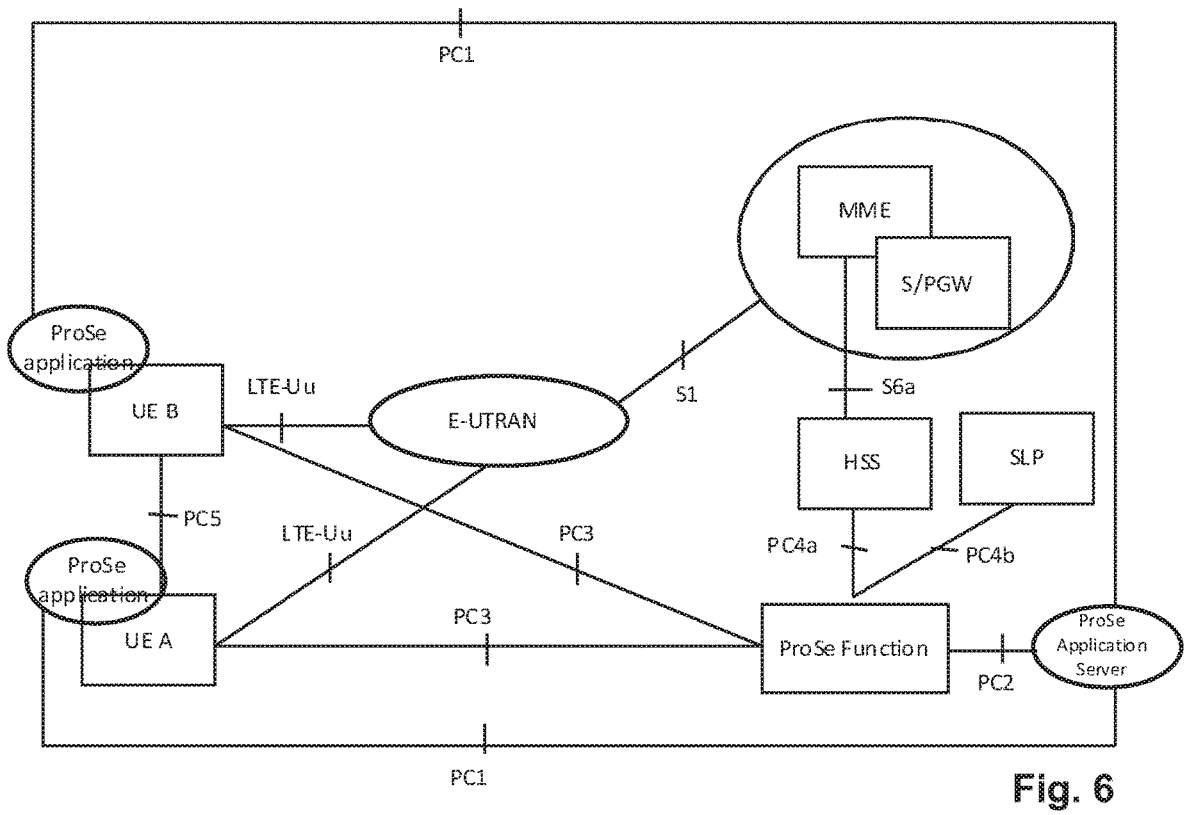
FIG. 6 illustrates an exemplary architecture model for ProSe for a non-roaming scenario.
Figure 7:
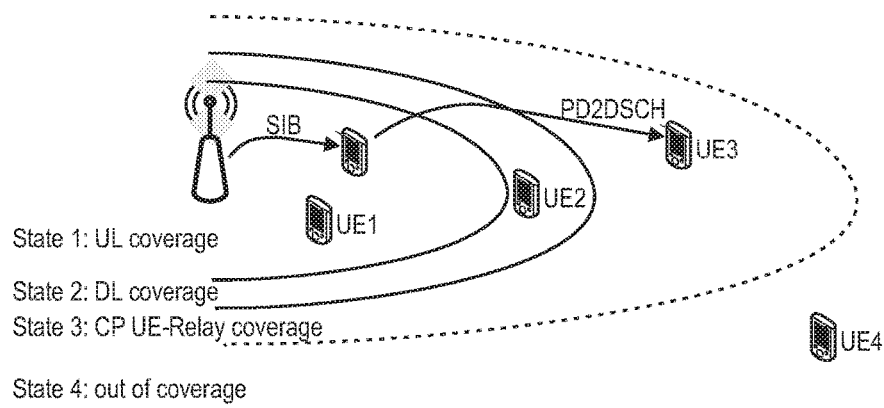
FIG. 7 illustrates cell coverage regarding four different states the D2D UE can be associated to, FIG. 8 schematically illustrates a PC5 interface for device-to-device direct discovery, FIG. 9 schematically illustrates a radio protocol stack for ProSe direct discovery.
Figure 8:
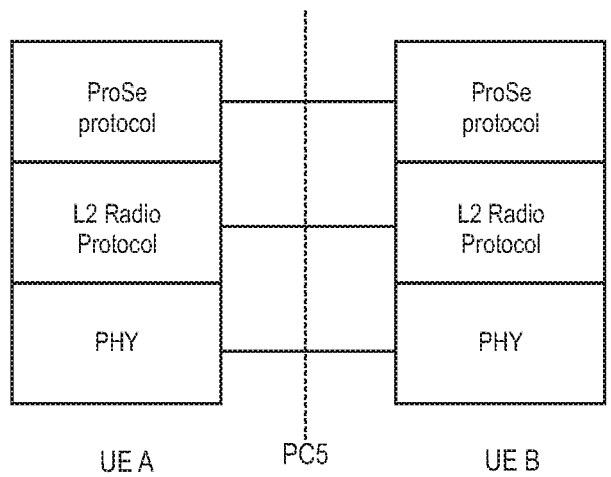
Figure 9:
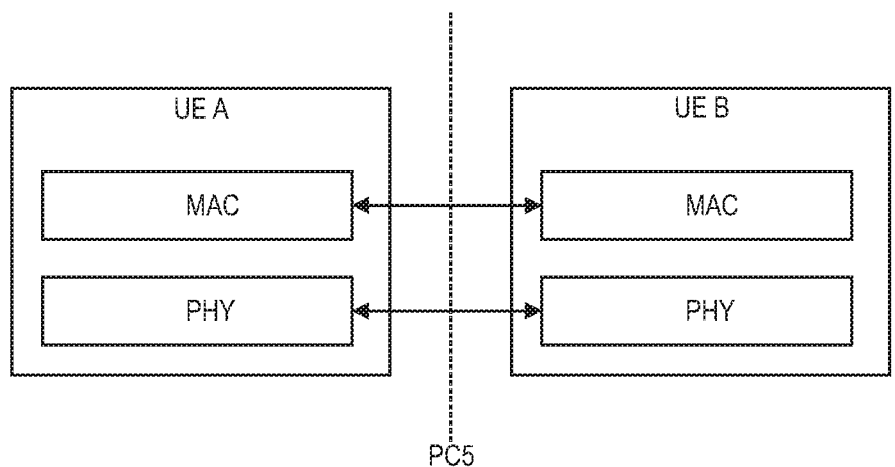
Figure 10:
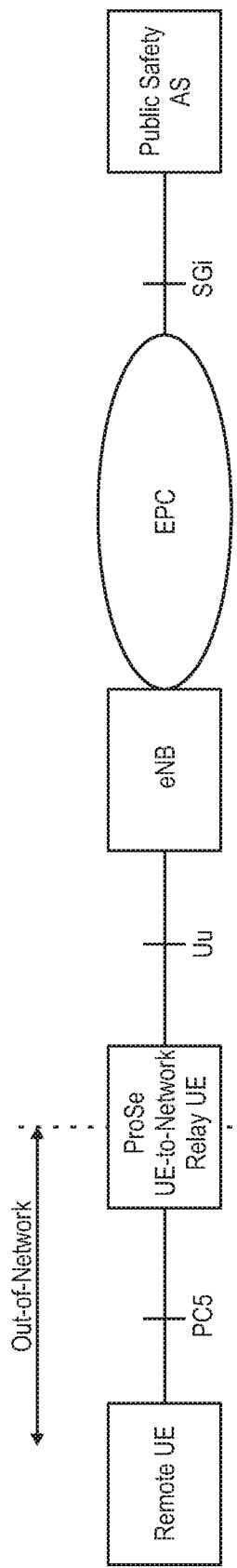
FIG. 10 shows a ProSe UE-to-Network Relay scenario.
Figure 11:
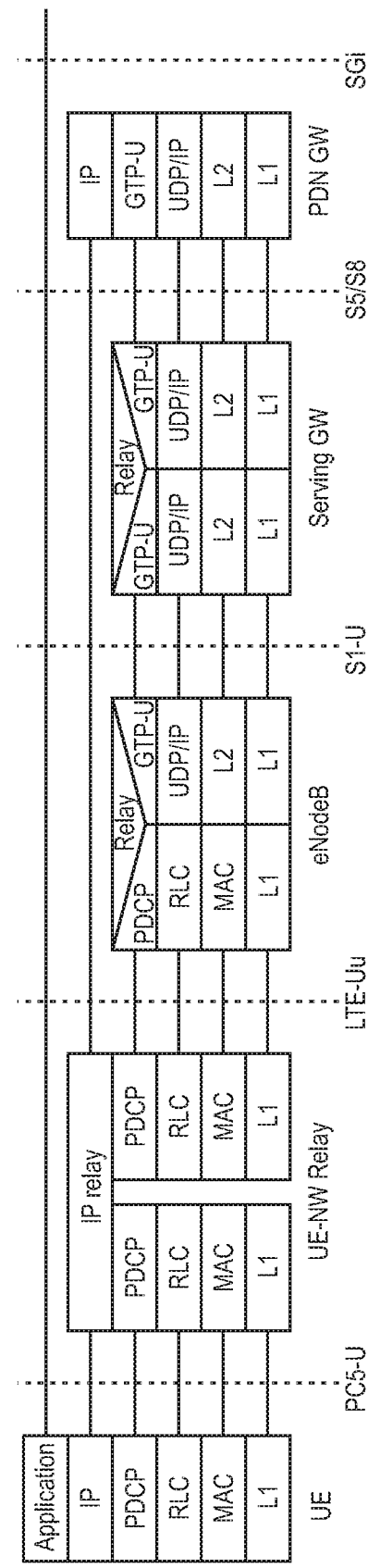
FIG. 11 shows the user plane protocol architecture for the ProSe UE-to-Network relay.

According to a second implementation, the relay discovery message(s) may comprise direction information of the overload state, where this direction information (if present) indicates a particular direction that the overload is confined to. Alternatively Of course, the direction information may not indicate the direction of the overload, but rather to the contrary the direction which is not overloaded. In particular, while for instance a processor or memory overload will likely affect both relay directions (uplink/downlink in the PC5 and/or Uu interface), other overload states might only be limited to one of the particular relay directions, i.e., either uplink or downlink via the PC5 interface (between remote UE and the relay UE; see FIG. 6, 10, or 11) or uplink/downlink via the Uu interface (between the relay UE and the eNodeB; see FIG. 6, 10, or 11). In this context it should be noted that in general there are three different types of UEs (see TS 22.179 current version 13.2.0): both receive/trans-mit allowed, transmit-only allowed, receive-only allowed. Thus, when for instance already serving as the relay for one or several receive/transmit-only remote UEs, the relay UE might not be able to support further receive/transmit-only remote UE(s) but on the other hand could well be able to support relaying in the other direction, i.e., transmit/receive-only remote UE(s). More generally, the remaining transmission/reception capability of the relay UE over a particular interface (PC5 or Uu) might be restricted thus causing an overload state in only one particular direction. Correspondingly, depending on the remaining transmission/reception capabilities, a relay UE might only be able to serve transmit-only UEs or receive-only UEs but not vice versa.

By including direction information for the overload state into the relay discovery message(s), it is possible to inform the remote UE(s) about the particular direction to which the overload situation pertains. As mentioned above, the direction indication may be as simple as distinguishing between uplink and downlink (e.g., via a one-bit field); in this case e.g., no direction information in the relay discovery message would mean that the overload situation concerns both downlink and uplink directions. Alternatively, the direction information might distinguish between the overload referring to only uplink or downlink or to both uplink and downlink. Furthermore, the direction information may even distinguish whether the uplink/downlink refers to the PC5 interface and/or the Uu interface. As such, the terms "uplink" and "downlink" as used herein should not be understood as referring only to the Uu interface, but are rather also applicable to the PC5 interface. The direction information may be indicated separately from or as a combination with the overload indication, in a similar manner as the time information. When considering a combined indication by use of 2 bits, one of the 4 possible bit combinations can be associated with the indication that the relay UE is not overloaded, whereas the remaining 3 of the 4 possible bit combinations can respectively indicate overload in only uplink direction, overload in only downlink direction, and overload in both uplink and downlink directions. Or, in a further enhancement, the remaining 3 of the 4 possible bit combinations can respectively indicate overload percentage e.g., 25%, 50%, 75% wherein the candidate remote UE shall perform a persistence check (draw a random decimal number between 0 and 1 and if this is below this value say 0.25 only then access the Relay) to access the particular Relay UE.

As such, in a similar manner as for the different types of UEs, the overloaded relay UEs may be in a "receive-only" mode (e.g., only allows receiving data from the remote UE and relaying it further to the eNB but not transmitting data to the remote UE) or "transmit-only mode" (e.g., only allowing transmitting data, received from the eNB, to the remote UE but not receiving data from the remote UE).

The remote UE(s) receiving this direction information can thus use this additional information after discovery to select the appropriate relay. For instance, while the remote UE might preferably select a relay UE which is not overloaded at all, there may be situations where the overloaded relay UE is the only discovered relay which the remote UE may select. Then, in case the overload only concerns a direction which the remote UE is not interested in (e.g., the uplink direction for a receive-only UE), this relay UE may be selected by this remote UE despite its overloaded state.

In said connection, the direction information of the overload (e.g., receive-only or transmit-only) or the "free" direction which is not overloaded and thus still admitted by the relay UE can also be displayed to a user of the remote user equipment (e.g., on the screen user interface). The user may then be allowed to select whether it is still desirable or not to select this uni-directionally restricted relay. Conversely, if the overload state is terminated, the user equipment can likewise indicate this termination to the user of the remote user equipment so as to allow him to speak or hear if the overload direction was UL and DL respectively (on PC4 interface).

According to still a further implementation of the first embodiment, the level of the overload state may be indicated. For instance, the overload state may be identified as being 50%, or 70% or 90%, i.e., the overload is distinguished between a number of different levels of severity. For instance, 4 (e.g., 20, 50, 70, and 90) or 8 different levels (e.g., 10, 30, 40, 50, 60, 70, 80, 100) can be distinguished by respectively 2 or 3 bits. The remote UE(s) receiving this additional level information can use same to apply an admission control. For instance, depending on the priority of the direct communication for which the remote UE is trying to establish a connection via the relay, the remote UE might even select an overloaded relay UE. As an implementation example, the admission control might be accomplished by introducing different priority levels which can then be compared to the different levels of overload, to determine whether to select an overloaded relay UE are not. Specifically, a particular level of overload may be associated with a particular predetermined priority threshold which indicates the minimum level of priority that a remote UE shall have in order to still be able to select the relay UE after discovery. Correspondingly, if the remote UE which wants to establish a PDN connection via the relay UE has a priority larger than the associated priority threshold of the indicated level, it may select the relay UE and establish a connection with it.

Any of the above discussed implementations of the first embodiment (i.e., the additional different information elements discussed above), may be used in combination too. For instance, the direction information available for the overload may be combined with the level information, thus for instance being able to indicate that the uplink direction is 90% overloaded while the downlink direction is only 20% overloaded. Or, the estimated time information may be indicated for respectively the different overload directions.

A further advantageous implementation refers to the reception of the overload indication in those remote UEs which are already served by the relay UE and will be explained in the following. It is assumed that the relay UE is already serving as a relay for one or several remote UEs. It is further assumed that also the remote UEs that are already being served by the relay UE as a relay receive the relay discovery message(s) (with the overload indication) transmitted by the relay UE according to the direct discovery mechanism. For instance, direct discovery messages may be used so as to synchronize the time and frequency of the remote UEs with the relay UEs, in which case the remote UEs should be able to continuously receive the relay discovery messages so as to keep their timing and frequency synchronized with the serving relay UE. Alternatively to receiving the overload indication in the relay discovery message, the remote UEs that are already connected to the relay UE and are being served may receive the overload indication differently, e.g., in a direct message from the relay UE. In any case, upon receiving the indication that the relay UE is overloaded, the served remote UE(s) may release the direct connection with the overloaded relay UE and optionally may additionally select a different relay (after appropriate direct discovery if necessary).

In a further advantageous implementation, only those remote UE(s) having low-priority communication via the relay UE shall release the direct connection with the overloaded relay UE so as to free the relay. Conversely, those remote UE(s) that are already being connected for high-priority communication via the relay UE may continue, despite learning via the overload indication that the relay UE is in an overloaded situation.

For instance, a "per-packet-priority" is defined for each remote UE and its communication via the relay UE. The access stratum uses the ProSe per Packet Priority associated with the protocol data unit to prioritize intra-UE transmissions (i.e., protocol data units associated with different priorities awaiting transmission inside the same UE). The way the medium is accessed in scheduled or non-scheduled transmission modes, while respecting the ProSe Per Packet Priority selected by applications, is in scope of the Access Stratum. Support of e.g., 8 levels for the ProSe Per Packet Priority is required to support a wide range of applications.

Upon learning that the relay UE is overloaded, the per-packet-priority can then be compared by the served remote UE(s) with a predetermined priority threshold to determine whether to continue the connection via the relay UE or whether to release the connection and optionally select a different relay UE as a relay to continue with. For example, only those remote UEs with a per-packet-priority higher than the predetermined threshold priority will continue using the overloaded relay UE, while other remote UEs with a lower per-packet-priority will discontinue the relaying (and may select a different relay instead).

Figure 3:
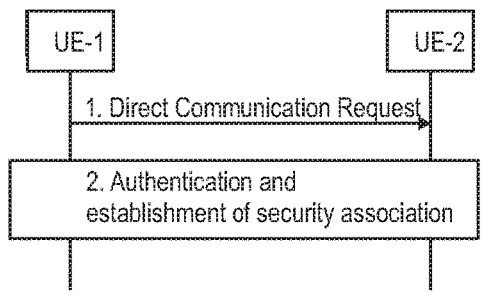
Figure 4:
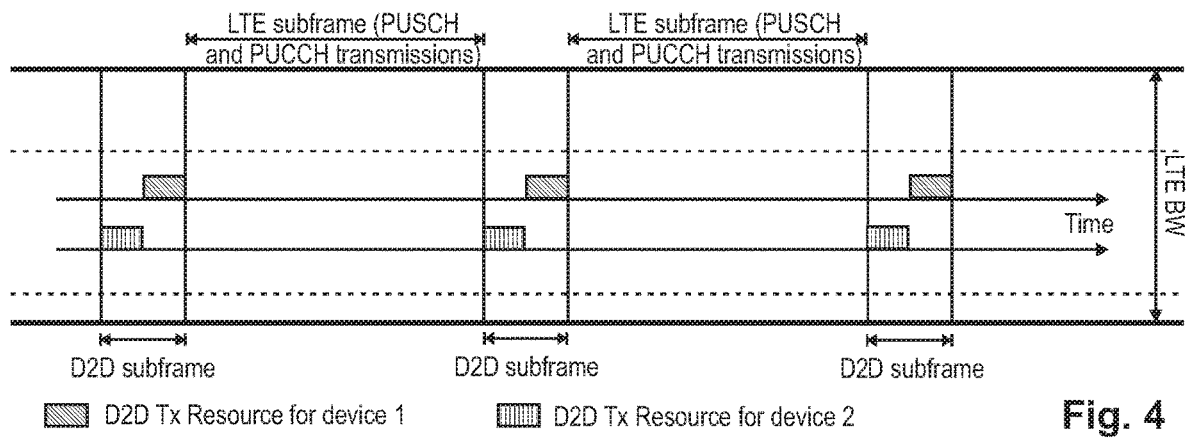
FIG. 4 illustrates the use of transmission/reception resources for overlay (LTE) and underlay (D2D) systems.
Figure 5:
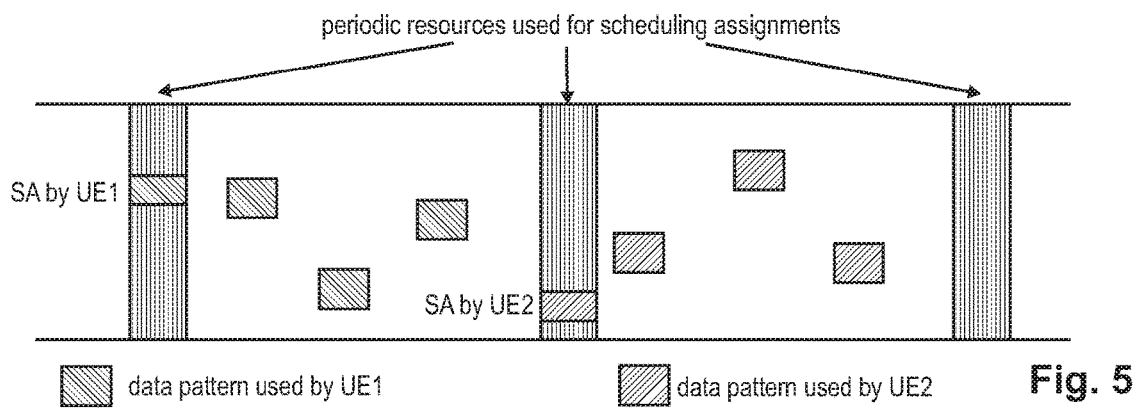
FIG. 5 illustrates the transmission of the Scheduling Assignment and the D2D data for two UEs.
Figure 14:
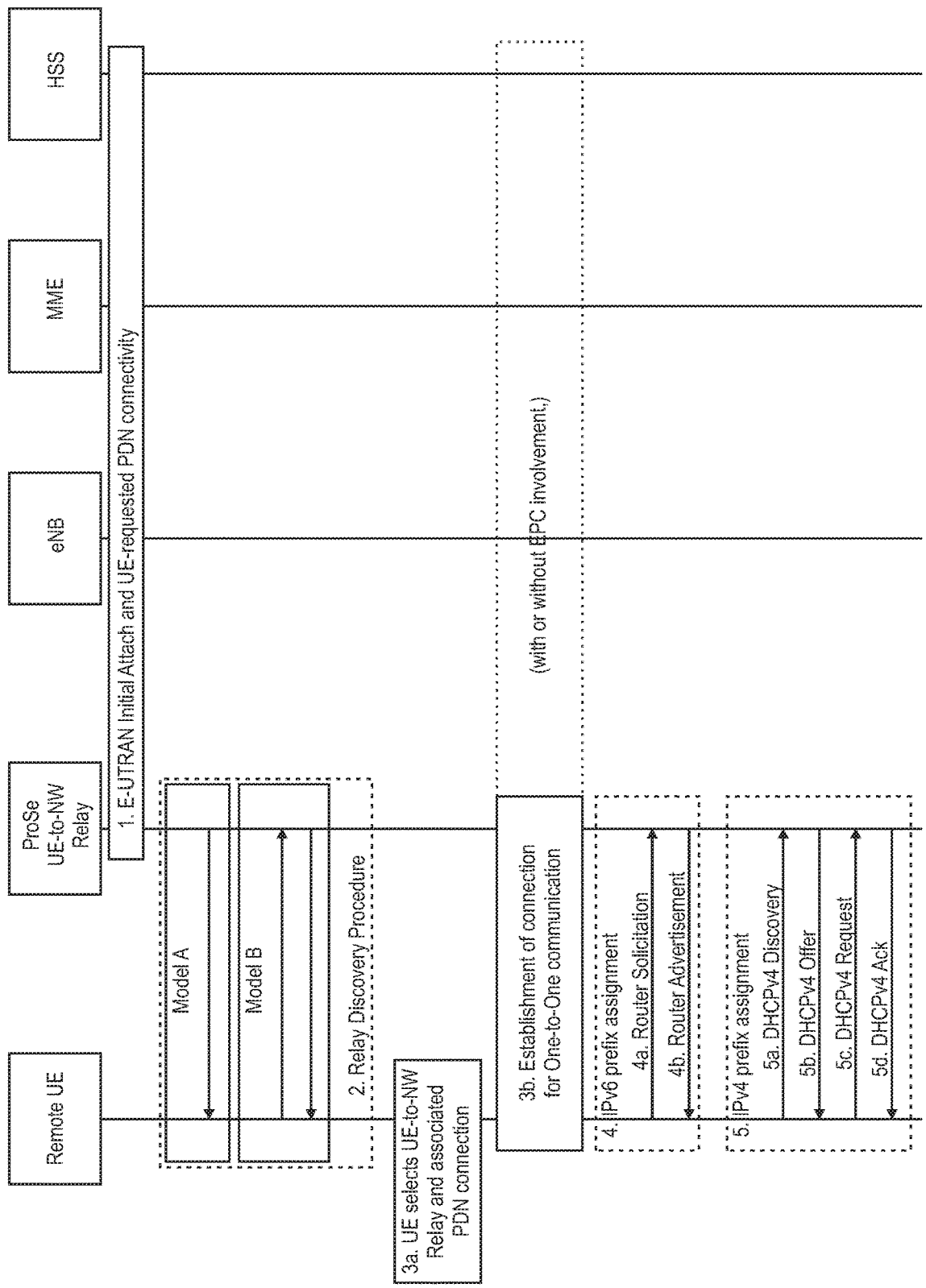
FIG. 14 illustrates the direct communication via ProSe UE-to-Network Relay for relay discovery and one-to-one communication establishment.

Despite using the overload indication to avoid unwanted connection attempts by remote UEs to an overloaded relay UE, some remote UEs might still select and try establishing a connection to an overloaded relay. One possible reaction of the overloaded relay UE, may be to not accept the connection attempts by the remote UEs. In particular, if the relay UE receives a Direct Communication Request from a remote UE (see FIG. 3), it may not start with the usual authentication process and establishment of the security association, but rather may reject the connection attempt, e.g., by responding with a suitable reject response message. This equally entails that the further steps of the relay UE (see FIG. 14) to allow address configuration for the remote UE (such as transmitting router advertisements) will not be performed.

Second Embodiment

In the following a second embodiment for solving the above problems will be described in detail. The second embodiment's main concept is different from that of the first embodiment. However, similar assumptions can be made for the scenario(s) with which the underlying principles of the second embodiment will be explained. In particular, a ProSe-enabled and ProSe relay-enabled UE is assumed which shall implement an improved relay direct discovery mechanism, as will be explained in the following.

In the same manner as for the above-described first embodiment, the relay UE shall monitor its overload state. In order to avoid mere repetition, reference is made to the corresponding passages of the first embodiment dealing with the step of determining whether or not the relay UE is overloaded; this for instance includes the definition of an overload state in the relay UE, when to perform the overload determination, etc.

The improved direct discovery mechanism of second embodiment does not necessarily change the actual relay discovery messages introduced in the background section, as with the first embodiment according to which the relay discovery messages are extended to comprise the overload indicator. Rather, different transmission resources for transmitting the relay discovery messages are used depending on whether the relay UE is overloaded or not, so as to achieve that, when the relay UE is overloaded, the relay discovery messages are only received by those remote UEs which are already served by the overloaded relay UE. Thereby, served remote UEs will be able to continue receiving relay discovery messages, while other remote UEs (i.e., which are currently not served by the overloaded relay UE) will not be able to receive the relay discovery messages transmitted by the overloaded relay UE and thus may not be able to discover the overloaded relay UE.

As already explained in the background section, the currently standardized discovery mechanism (not for relay, but for UE-to-UE direct connection) allows the discovery resources (from within a resource pool) to be either scheduled by the eNodeB (Type 2) or to be autonomously selected by the relay UE from a corresponding resource pool (which may be broadcast via SIB in the cell of the eNodeB) (Type 1).

An example can be taken by looking at the ASN.1 structure from 3GPP TS 36.331 V12.6.0.
SL-DiscConfig
The IE SL-DiscConfig specifies the dedicated configuration information for sidelink direct discovery.

```
SL-DISCCONFIG INFORMATION ELEMENT
-- ASN1START
SL-DiscConfig-r12 ::=         SEQUENCE {
    discTxResources-r12         CHOICE {
        release                     NULL,
        setup                       CHOICE
{
        scheduled-r12               SEQUENCE {
            discTxConfig-r12
SL-DiscResourcePool-r12 OPTIONAL, -- Need ON
            discTF-IndexList-r12
SL-TF-IndexPairList-r12 OPTIONAL, -- Need ON
            discHoppingConfig-r12
SL-HoppingConfigDisc-r12
            OPTIONAL -- Need ON
        },
        ue-Selected-r12
        SEQUENCE {
            discTxPoolDedicated-r12
        SEQUENCE {
                poolToReleaseList-r12
SL-TxPoolToReleaseList-r12 OPTIONAL, -- Need ON
                poolToAddModList-r12
SL-DiscTxPoolToAddModList-r12 OPTIONAL -- Need ON
            }
            OPTIONAL -- Need ON
        }
    }
}
        OPTIONAL, -- Need ON
...
}
SL-DiscTxPoolToAddModList-r12 ::=     SEQUENCE (SIZE
(1..maxSL-TxPool-r12)) OF SL-DiscTxPoolToAddMod-r12
SL-DiscTxPoolToAddMod-r12 ::=         SEQUENCE {
    poolIdentity-r12                  SL-
TxPoolIdentity-r12,
    pool-r12                          SL-
DiscResourcePool-r12
}
SL-TF-IndexPairList-r12 ::=     SEQUENCE (SIZE (1..maxSL-
TF-IndexPair-r12)) OF SL-TF-IndexPair-r12
SL-TF-IndexPair-r12 ::=        SEQUENCE {
    discSF-Index-r12                  INTEGER (1..
200) OPTIONAL, -- Need ON
    discPRB-Index-r12                 INTEGER (1.. 50)
        OPTIONAL -- Need ON
}
-- ASN1STOP
SL-DiscConfig field descriptions
discTxResources
Indicates the resources assigned to the UE for discovery
announcements, which can either be a pool from which the UE may
select or a set of resources specifically assigned for use by the UE.
discTxConfig
Indicates the resources configuration used when E-UTRAN
schedules Tx resources (i.e., the fields discSF-Index and
discPRB-Index indicate the actual resources to be used).
SL-TF-IndexPair
A pair of indices, one for the time domain and one for the
frequency domain, indicating resources within the pool
covered by discTxConfig, see TS 36.211 [21,9.5.6].
```

A similar mechanism could be assumed for the relay discovery mechanism where the radio resources for transmitting the relay discovery message(s) can be either scheduled (scheduled-r12) by the eNodeB or may be autonomously selected (ue-selected-r12) by the relay UE from a corresponding resource pool. It should be noted that also remote UEs which are out of coverage of the eNodeB, and thus would not directly receive the SIB information from the eNodeB must to be able to receive the relay discovery messages transmitted by the relay UEs. Correspondingly, it must be ensured that direct discovery for relays is implemented by using radio resources known both by the relay UE(s) and the remote UE(s). This may be done for instance by the relay UE broadcasting system information (SIB) received from the eNodeB such that also the remote UEs are aware of such information and thus can monitor or the same radio resources for relay discovery as used by the relay UE to transmit the relay discovery messages. In this case, as explained above the actually used radio resources for the transmission of the relay discovery messages may be scheduled by the eNodeB or may be autonomously selected by the relay UE, assuming that the remote UE(s) are monitoring all the radio resources of the corresponding radio resource pool. Alternatively, a radio resource (time-frequency resources) pool may be preconfigured in the relay UEs and the remote UEs, for example pre-stored in the USIM (Universal Subscriber Identity Module) of the UEs.

In summary, particular radio resources are defined in the system and allow interaction between the relay UEs and the remote UEs to implement the direct discovery mechanism for relays.

According to the second embodiment, different sets of radio resources are used to transmit the relay discovery message(s) depending on the overload state of the UE. In more detail, a first set of radio resources will be used by the relay UE to transmit the relay discovery message(s) when it is determined that no overload exists in the relay UE, wherein the first set of resources are monitored in general by all remote UEs in the cell (already served by the overloaded relay UE or not served by the overloaded relay). This first set of radio resources may be those radio resources normal defined in the current standardization for said purpose, e.g., defined by SIB or preconfigured in USIM of UEs.

A second set of radio resources, different from the first set of radio resources, will be used by the relay UE to transmit the relay discovery message(s) when it is determined that the relay UE is overloaded. This second set of radio resources shall only be monitored by those remote UEs which are currently already served by the relay UE, but not by those remote UEs which are not served. To said end, second set of radio resources may be defined by the relay UE itself and then correspondingly informed to the remote UEs that it is currently serving as a relay. Correspondingly, the relay UE will determine this second set of radio resources to be different from the first set of radio resources, such that remote UEs monitoring the first set of radio resources will not receive relay discovery messages transmitted on the second set of radio resources. Alternatively, the second set of radio resources can be determined by the eNodeB and can be broadcast in its cell e.g., in the system information (SIB); in this case, also remote UEs that are out of coverage of the eNB shall be able to receive the corresponding system information, which e.g., may be achieved by generally relaying system information by the relay UEs to extend the coverage of system information. According to a still further alternative, the second set of radio resources may be also preconfigured, for example in the USIM of the UEs.

Figure 19:
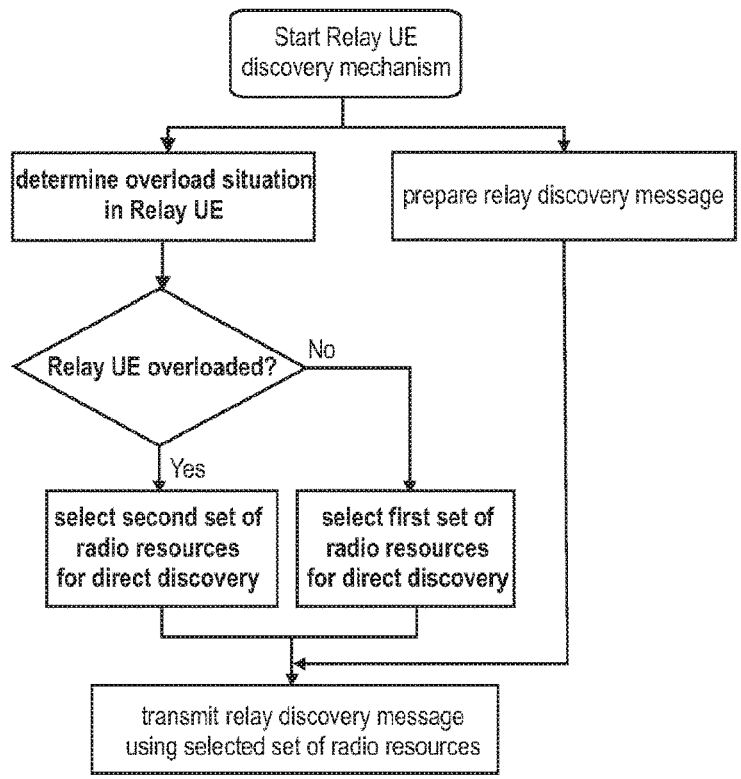
FIG. 19 is a sequence diagram illustrating the relay UE behavior according to an exemplary implementation of the second embodiment.

In summary, at least two different sets of radio resources are defined for the relay direct discovery mechanism, where the relay UE may use one set of radio resources when overloaded and the other set of radio resources when not in an overload state. The relay direct discovery mechanism performed by the relay UE correspondingly works as follows. A corresponding sequence diagram is illustrated in FIG. 19 for the relay UE according to a general exemplary second embodiment. According to the general relay direct discovery mechanism, relay discovery messages are prepared according to model A or model B (i.e., either periodically or in response to a dedicated relay discovery solicitation message, see also FIGS. 12, 13). According to one exemplary implementation of the second embodiment, the corresponding relay discovery (announcement or response) messages can be those as defined for the currently standardized relay discovery mechanism as explained in connection with FIGS. 12 and 13.

Moreover, although this is not yet standardized, the relay discovery messages could serve the additional purpose of maintaining synchronization between the relay and remote UEs. To this purpose, there relay discovery messages may include additional information such as synchronization codes and signals like Primary and Secondary Synchronization codes. Consequently, it is advantageous that all remote UEs (independent from whether they are already served by the relay UE or not) shall receive the relay discovery messages transmitted by the relay UE.

As apparent from FIG. 19, the relay UE (continuously) monitors its components to determine whether an overload situation exists in the relay UE or not. Depending on the outcome of the determination, different sets of radio resources are selected for the direct discovery, i.e., the transmission of the just prepared relay discovery message. In the particular example used for FIG. 19, the second set of radio resources is selected when the relay UE is determined to be overloaded, while the first set of radio resources is selected when the relay UE is determined to not be overloaded. Finally, the step of transmitting the relay discovery message is performed by using the selected set of radio resources, be it the first or second set.

The remote UEs have to be configured to properly participate in the direct discovery mechanism for relay UEs according to the second embodiment. One exemplary implementation of the remote UE behavior is illustrated in the sequence diagram of FIG. 20, which is divided as to whether the remote UEs already served by the relay UE (i.e., the relay UE is already acting as a relay for this particular remote UE) or is unserved (i.e., the relay UE is currently not acting as the relay for this particular remote UE). As already said before, the served and unserved remote UEs monitor different set of radio resources to thus achieve that the served remote UEs will continue to receive the relay discovery messages even when the overloaded relay UE uses the second set of resources for transmitting the relay discovery messages.

Figure 20:
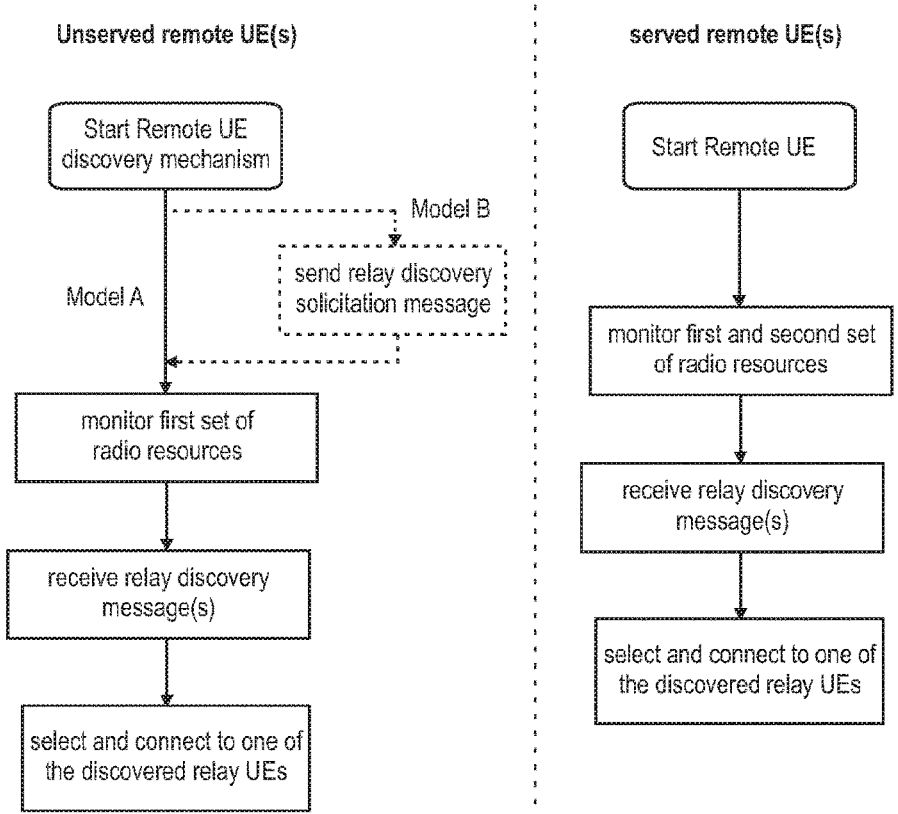
FIG. 20 is a sequence diagram illustrating the remote UE behavior according to an exemplary implementation of the second embodiment.

As apparent from FIG. 20, unserved remote UEs shall monitor only the first set of radio resources used by the relay UE when not in an overload situation, while served remote UEs will monitor as well the second set of resources used by the relay UE when overloaded. As a result, unserved remote UEs will not receive relay discovery messages transmitted by using the second set of radio resources such that overloaded relay UEs will not be discovered during relay direct discovery (model A or model B) performed by the remote UEs; overloaded relay UEs will be invisible. However, remote UEs that are already connected to the relay UE and monitor at least the second set of resources, will receive the relay discovery messages not only when the relay UE is not overloaded but also when the relay UE is overloaded. This is particularly advantageous when using the relay discovery messages for time and frequency synchronization, since the remote UEs that are already connected to the relay UE will be able to maintain time and frequency synchronization.

According to an advantageous implementation of the second embodiment (contrary to FIG. 20), instead of monitoring both the first and the second set of radio resources, the served remote UEs (i.e., those UEs for which the relay UEs already acting as the relay) will monitor only the first or second set of resources depending on whether the relay UE is overloaded or not. For said purpose, the served remote UEs shall be informed about the overload status of the relay UE, such that at all times the "correct" set of radio resources is monitored. For instance, when the relay UE determines a change in the overload state (i.e., becoming overloaded or overload terminates), the relay UE informs its currently served remote UEs about the overload state change. This could be done by using a direct message such as the ones used by eNB towards the RRC Connected UEs like reconfiguration message, but on the PC5 interface.

In any case, the served remote UEs are thus kept updated on the overload state of the relay UE, and thus will monitor those radio resources which are then actually used by the relay UE to transmit the relay discovery message(s).

According to this advantageous implementation, those remote UEs that are already connected to the relay UE do not need to monitor both set of radio resources and thus processing is reduced in said respect. However, this conversely means that the served remote UEs will not receive relay discovery messages transmitted by the relay UE that is not overloaded. In the case where the relay discovery messages are normally used for time and frequency synchronization, the served remote UEs may apply an alternative mechanism for time and frequency synchronization at least for the time where the relay UE is not overloaded (i.e., where the served remote UEs will not receive relay discovery messages).

Third Embodiment

In the following a third embodiment for solving the above problems will be described in detail. The concept of the third embodiment is different from that of the first and second embodiments explained above. Similar assumptions can be made for the third embodiment. For instance, a ProSe-enabled and ProSe-relay-enabled UE is assumed which shall implement an improved relay direct discovery mechanism, as will be explained in the following. In addition to the assumptions presented for the first and second embodiments, the third embodiment is mostly restricted to relay direct discovery according to model A (i.e., where the relay discovery messages are periodically transmitted).

In the same manner as for the first and second embodiments described above, the relay UE shall monitor its overload state. Again, to avoid mere repetition, reference is made to the corresponding passages of the first embodiment dealing with the step of determining whether or not the relay UE is overloaded; this for instance includes the definition of an overload state in the relay UE, when to perform the overload determination, etc.

The improved direct discovery mechanism of the third embodiment does not necessarily change the actual relay discovery messages of the background section (in contrast to the first embodiment), nor are different radio resources used by the relay UE for the transmission of the relay discovery messages (in contrast to the second embodiment). In other words, the third embodiment may reuse the existing (or other suitable) relay discovery messages and may reuse the existing (or other suitable) radio resource allocation mechanism(s) (Type 1 or Type 2, or otherwise) e.g., envisaged already in the prior art in said respect.

Rather, the idea behind the third embodiment is to adapt the periodicity of transmitting the relay discovery messages depending on the overload status of the relay UE.

In particular, as explained in the background section, relay direct discovery according to model A, where relay discovery messages are periodically transmitted/broadcast by the relay UE, the periodicity used for periodically transmitting the relay discovery messages is set by the eNodeB or higher layers using higher layer signaling including RRC configuration. In other words, the transmission of the relay discovery messages (according to model A) is performed at a particular regular time instances which can be configured by the eNodeB.

The relay UE may follow this periodicity for transmitting the relay discovery messages as long as it is not overloaded. On the other hand, when the relay UE determines that it is overloaded, the periodicity of the relay discovery message transmissions is increased; in other words, the time period between subsequently transmitted relay discovery messages is increased such that the relay discovery messages are transmitted less often. Then, if the relay UE determines that the overload situation ceases to exist, the periodicity may be reduced back to the initial value.

Figure 21:
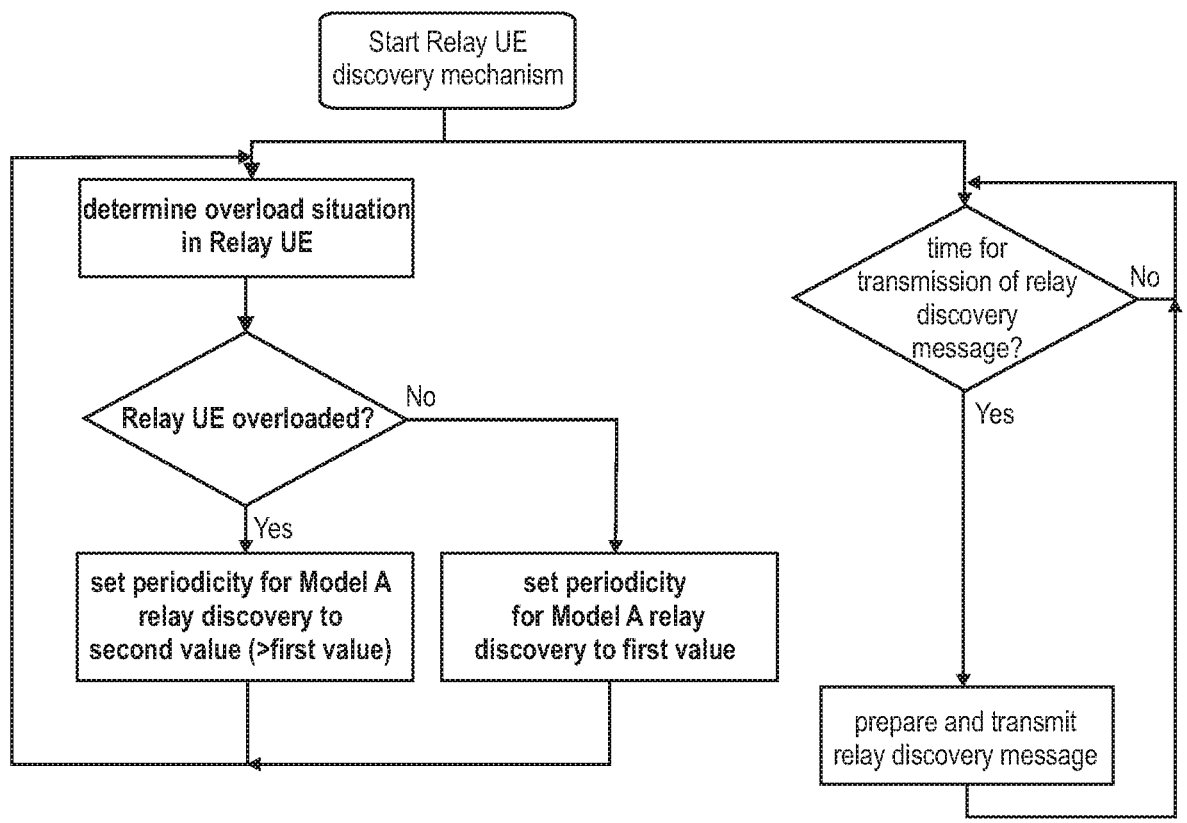
FIG. 21 is a sequence diagram illustrating that relay UE behavior according to an exemplary implementation of the third embodiment.

FIG. 21 is a sequence diagram illustrating the relay UE behavior for a general exemplary third embodiment. As apparent from this figure, the usual relay direct discovery according to model A is assumed, where the relay UE at particular periodic time instances prepares and transmits a relay discovery message. In the exemplary implementation of the third embodiment according to FIG. 21, an additional parallel processing chain is assumed where the relay UE first determines whether an overload situation exists in the relay UE and, depending on the outcome of this determination, sets the periodicity for the model A relay discovery to an appropriate value. In particular, if the relay UE is overloaded, a second value is used for the periodicity of transmitting relay discovery messages, while a first value is used for the periodicity of transmitting relay discovery messages when the relay is determined to not be overloaded. It should be noted that the second value is larger than the first value, such that the periodicity is increased when the relay UE is overloaded and then again decreased once there overload state no longer exists. Although not directly visible from FIG. 21, the step where the relay UE determines when to transmit the relay discovery message(s) (i.e., "time for transmission of relay discovery message?") directly depends on the parallel processing of setting the periodicity to different values.

As mentioned before, the first (initial) value for the periodicity of transmitting relay discovery messages can be e.g., determined by the eNodeB. Likewise, also the second (increased) value for the periodicity of transmitting relay discovery messages can be for instance determined by the eNodeB as well. Alternatively, the second value for the periodicity can be determined by the relay UE itself without indication from the eNodeB.

The second value itself shall be larger than the first value in order to achieve that the relay discovery messages are transmitted less frequently by the relay UE when in an overload state. Advantageously, the second periodicity value is a multiple of the first periodicity value (e.g., every second, vs every 0.2 seconds) such that it is ensured that the remote UEs monitor the corresponding relay discovery radio resources at the appropriate points in time. Furthermore, in this advantageous implementation of the third embodiment it is not necessary to inform the remote UEs as to whether the relay UE is overloaded or not.

Alternatively, the second periodicity value may be any larger value (not restricted to multiples of the initial first value), in which case however the remote UEs would have to be provided with corresponding information on the respective periodicity to be applied as well as on information when to apply which periodicity. This would also have the benefit that the remote UEs have to monitor less often for relay discovery messages which may save some battery at the remote UEs.

According to an advantageous implementation of the third embodiment, the second periodicity value may be set such that practically no further relay discovery messages are transmitted by the relay UE; for instance, the second value may be set to infinity.

By transmitting the relay discovery messages less often by the relay UE in overload situations, it is possible to avoid that remote UEs discover the overloaded relay UE at least for a particular period of time. Correspondingly, the relay selection is expedited and no additional processing load is incurred in the overloaded relay UE.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for discovery of a relay user equipment within a mobile communication network, the relay user equipment configured to perform direct communication over a direct sidelink connection respectively with one or more remote user equipment, the relay user equipment being connected to a radio base station in the mobile communication network and further configured to serve as a relay respectively for the one or more remote user equipment so as to relay communication between the one or more remote user equipment and the radio base station, the method comprising:
   determining, by the relay user equipment, whether or not an overload situation exists in the relay user equipment, the overload situation preventing the relay user equipment to serve as a relay for another remote user equipment, and
   transmitting, by the relay user equipment, a relay discovery message including an overload indication that indicates a result of the determination as to whether or not the overload situation exists in the relay user equipment,
   wherein, in a case where the relay user equipment determines the overload situation does not exist in the relay user equipment, the relay discovery message is transmitted using a first set of radio resources,
   wherein in a case where the relay user equipment determines the overload situation exists in the relay user equipment, the relay discovery message is transmitted using a second set of radio resources different from the first set of radio resources.

2. The method according to claim 1, wherein the overload situation includes at least one of the following being overloaded: a processor of the relay user equipment, a memory of the relay user equipment, ports of the relay user equipment, or logical channel identifications of the relay user equipment.

3. The method according to claim 1, further comprising:
   in a case where the relay user equipment determines the overload situation exists in the relay user equipment, estimating, by the relay user equipment, a duration of the overload situation in the relay user equipment,
   wherein the relay discovery message further includes time information that indicates the duration of the overload situation in the relay user equipment,
   wherein the time information is used by the another remote user equipment to determine whether or not to use the relay user equipment as a relay for communication.

4. The method according to claim 1, wherein the relay discovery message is transmitted periodically or after the relay user equipment receives a relay solicitation message from the another remote user equipment, and the relay solicitation message requests discovery of the relay user equipment.

5. The method according to claim 1, wherein, in a case where the relay user equipment determines the overload situation exists in the relay user equipment, the relay user equipment will not serve as a relay for additional remote user equipment, and will not transmit router advertisement messages.

6. The method according to claim 1, further comprising:
   in a case where the relay user equipment determines the overload situation exists in the relay user equipment, determining, by the relay user equipment, whether the overload situation affects an uplink direction or a downlink direction between the relay user equipment and the another remote user equipment or between the relay user equipment and the radio base station,
   wherein the relay discovery message further includes direction information that indicates whether the overload situation affects the uplink direction or the downlink direction between the relay user equipment and the another remote user equipment or between the relay user equipment and the radio base station,
   wherein the direction information is used by the another remote user equipment to determine whether or not to use the relay user equipment as a relay for communication,
   wherein the direction information is displayed to a user of the another remote user equipment.

7. The method according claim 1, further comprising:
   in a case where a first remote user equipment is currently using the relay user equipment as a relay for communication with the radio base station, determining, by the first remote user equipment, a priority of the communication with the radio base station upon receiving the relay discovery message;

in a case where the priority is lower than or equal to a predetermined priority threshold, stopping, by the first remote user equipment, the communication with the radio base station, and selecting a different relay user equipment to serve as the relay for communication between the first remote user equipment and the radio base station; and in a case where the priority is higher than the predetermined priority threshold, continuing, by the first remote user equipment, to use the relay user equipment as the relay for the communication with the radio base station.

8. The method according to claim 1, wherein the relay user equipment serves as a relay for a first remote user equipment to relay communication, wherein a first direct sidelink connection is established between the relay user equipment and the first remote user equipment over which communication is relayed between the relay user equipment and the first remote user equipment.

9. The method according to claim 1,
wherein the relay discovery message further includes discovery information, which is usable by the one or more remote user equipment to discover the relay user equipment and services it provides,
wherein the discovery information includes at least one of the following information:
Type: type of the relay discovery message,
Announcer Info and Discoveree Info: information about the relay user equipment,
Discovery Type: type of discovery, or
ProSe Relay UE ID: identifier of the relay user equipment.

10. The method according to claim 1, wherein the one or more remote user equipment is
in coverage of the radio base station, or
out-of-coverage of the radio base station and within coverage of the relay user equipment, which is in coverage of the radio base station.

11. The method according to claim 1,
wherein the first set of radio resources are monitored by a remote user equipment not being served by the relay user equipment,
wherein the second set of radio resources are monitored by a remote user equipment currently being served by the relay user equipment.

12. The method according to claim 1, further comprising:
in a case where the relay user equipment determines the overload situation exists in the relay user equipment, increasing, by the relay user equipment, a time period between transmission of the relay discovery message and transmission of a subsequent relay discovery message; and
in a case where the relay user equipment determines the overload situation does not exist in the relay user equipment, decreasing, by the relay user equipment, the time period between transmission of the relay discovery message and transmission of the subsequent relay discovery message.

13. A relay user equipment configured to participate in relay discovery within a mobile communication network, the relay user equipment configured to perform direct communication over a direct sidelink connection respectively with one or more remote user equipment, the relay user equipment being connected to a radio base station in the mobile communication network and further configured to serve as a relay respectively for the one or more remote user equipment so as to relay communication between the one or more remote user equipment and the radio base station, the relay user equipment comprising:

a processor configured to determine whether or not an overload situation exists in the relay user equipment, the overload situation preventing the relay user equipment to serve as a relay for another remote user equipment; and a transmitter configured to transmit a relay discovery message that includes an overload indication that indicates a result of the determination as to whether or not the overload situation exists in the relay user equipment, wherein, in a case where the overload situation does not exist in the relay user equipment, the relay discovery message is transmitted using a first set of radio resources, wherein in a case where the overload situation exists in the relay user equipment, the relay discovery message is transmitted using a second set of radio resources different from the first set of radio resources.

14. The relay user equipment according to claim 13, wherein the overload situation includes at least one of the following being overloaded: a processor of the relay user equipment, a memory of the relay user equipment, ports of the relay user equipment, or logical channel identifications of the relay user equipment.

15. The relay user equipment according to claim 13, wherein, in a case where the overload situation exists in the relay user equipment, the processor is further configured to estimate a duration of the overload situation in the relay user equipment,
wherein the relay discovery message further includes time information that indicates the duration of the overload situation in the relay user equipment,
wherein the time information is used by the another remote user equipment to determine whether or not to use the relay user equipment as a relay for communication.

16. The relay user equipment according to claim 13, wherein the relay discovery message is transmitted periodically or after the relay user equipment receives a relay solicitation message from the another remote user equipment, and the relay solicitation message requests discovery of the relay user equipment.

17. The relay user equipment according to claim 13, wherein,
in a case where the overload situation exists in the relay user equipment, the processor is further configured to determine whether the overload situation affects an uplink direction or a downlink direction between the relay user equipment and the another remote user equipment or between the relay user equipment and the radio base station,
wherein the relay discovery message further includes direction information that indicates whether the overload situation affects the uplink direction or the downlink direction between the relay user equipment and the another remote user equipment or between the relay user equipment and the radio base station.

18. A remote user equipment configured to discover a relay user equipment within a mobile communication network, the relay user equipment configured to perform direct communication over a direct sidelink connection respectively with one or more remote user equipment, the relay user equipment being connected to a radio base station in the mobile communication network and further configured to serve as a relay respectively for the one or more remote user equipment so as to relay communication between the one or more remote user equipment and the radio base station, the remote user equipment comprising:
- a receiver configured to receive a relay discovery message including an overload indication that indicates a result of a determination in the relay user equipment as to whether or not an overload situation exists in the relay user equipment, the overload situation preventing the relay user equipment to serve as a relay for the remote user equipment,
- a processor configured to use the relay user equipment as a relay for communication with the radio base station in a case where the overload indication indicates the overload situation does not exist in the relay user equipment, and configure to not use the relay user equipment as the relay for communication with the radio base station in a case where the overload indication indicates the overload situation exists in the relay user equipment,
- wherein, in a case where the overload situation does not exist in the relay user equipment, the relay discovery message is received using a first set of radio resources,
- wherein in a case where the overload situation exists in the relay user equipment, the relay discovery message is received using a second set of radio resources different from the first set of radio resources.

* * * * *